US011806657B2

(12) United States Patent  
Sansao et al.

(10) Patent No.: US 11,806,657 B2  
(45) Date of Patent: Nov. 7, 2023

(54) SEPARATION OF PARTICLES OF DIFFERENT SURFACE ENERGIES THROUGH CONTROL OF HUMIDITY

(71) Applicant: South Dakota Board of Regents, Pierre, SD (US)

(72) Inventors: Bernado Moreno Baqueiro Sansao, Salvador (BR); Jon Kellar, Rapid City, SD (US); William Cross, Rapid City, SD (US); Albert Romkes, Rapid City, SD (US)

(73) Assignee: SOUTH DAKOTA BOARD OF REGENTS, Pierre, SD (US)

( * ) Notice: Subject to any disclaimer, the term of this patent is extended or adjusted under 35 U.S.C. 154(b) by 0 days.

(21) Appl. No.: 17/467,155

(22) Filed: Sep. 3, 2021

(65) Prior Publication Data

US 2022/0072466 A1 Mar. 10, 2022

Related U.S. Application Data

(60) Provisional application No. 63/074,616, filed on Sep. 4, 2020.

(51) Int. Cl.
| | | |
|---|---|---|
| *B01D 45/10* | (2006.01) | |
| *B01D 47/05* | (2006.01) | |
| *B01D 49/00* | (2006.01) | |

(52) U.S. Cl.  
CPC ............ *B01D 47/05* (2013.01); *B01D 45/10* (2013.01); *B01D 49/003* (2013.01); *B01D 2202/00* (2013.01)

(58) Field of Classification Search  
CPC .... B01D 47/05; B01D 45/10; B01D 2202/00; B01D 49/003  
See application file for complete search history.

(56) References Cited

U.S. PATENT DOCUMENTS

| | | | | |
|---|---|---|---|---|
| 5,902,385 A | * | 5/1999 | Willeke | B01D 45/10 96/324 |
| 2008/0152547 A1 | * | 6/2008 | Hopke | G01N 15/065 356/37 |
| 2018/0001249 A1 | * | 1/2018 | Sher | B01D 47/05 |

FOREIGN PATENT DOCUMENTS

| | | | | |
|---|---|---|---|---|
| CA | 2729644 A1 | * | 1/2010 | ........... A61K 9/0075 |
| CA | 2895056 A1 | * | 6/2014 | ............... B05D 1/62 |
| CA | 2903827 A1 | * | 9/2014 | ............. A61K 31/70 |
| CN | 104968438 A | * | 10/2015 | ........... G01N 1/2247 |

(Continued)

OTHER PUBLICATIONS

A. D. Zimon, "Chapter IV," in Adhesion of Dust and Powder, New York, Consultants Bureau, 1969, 43 pages.

(Continued)

*Primary Examiner* — Dung H Bui  
(74) *Attorney, Agent, or Firm* — Goodhue, Coleman & Owens, P.C.

(57) ABSTRACT

An impact test apparatus can be used to determine particle interfacial energies with varying relative air humidity. It was observed that capillary condensation increased the adhesive forces of hydrophilic materials. A systems humidity separation window was identified and the differences in interfacial energy for a hydrophilic surface and for a hydrophobic surface can be exploited in order to achieve the separation of particles. Separation and concentration of particles, particularly particles within a mineral ore body, can be obtained.

24 Claims, 20 Drawing Sheets

(56) References Cited

FOREIGN PATENT DOCUMENTS

| CN | 109181643 A | * | 1/2019 | |
| CN | 109316981 A | * | 2/2019 | |
| EP | 0518221 A1 | * | 12/1992 | ............. B01D 45/10 |

OTHER PUBLICATIONS

A. D. Zimon, "Chapter V," in Adhesion of Dust and Powder, New York, Consultants Bureau, 1969, 41 pages.

Argento, C. and R. French, Parametric tip model and force-distance relation for Hamaker constant determination from atomic force microscopy. Journal of Applied Physics, 1996. 80(11): p. 6081-6090.

Arkles, Barry et al. (2014). Silane Coupling Agents: Connecting Across Boundaries. Gelest, Inc. Version 3.0 p. 5.

B. Moreno Baqueiro Sansao, J. J. Kellar, W. M. Cross and A. Romkes, "Separation of Particles of Different Surface Energies Through Control of Humidity," Minerals Engineering, vol. 160, p.

B. Moreno Baqueiro Sansao, J. J. Kellar, W. M. Cross, K. Schottler and A. Romkes, "Comparison of surface energy and adhesion energy of surface-treated particles". Powder Technology, vol. 384, pp. 267-275, 2021.

Berard, V., Lesniewska, E., Andres, C., Pertuy, D., Laroche, C., Pourcelot, Y. (2002). Dry powder inhalers: influence of humidity on topology and adhesion studied by AFM. International Journal of Pharmaceutics, 232, pp. 213-224.

Biresaw, G., & Carriere, C. J. (2001). Correlation between mechanical adhesion and interfacial properties of starch/biodegradable polyester blends. Journal of Polymer Science: Part B: Polymer Physics, 39, 920-930.

Bleiwas, D.I., Estimated water requirements for the conventional flotation of copper ores. 2012, US Geological Survey, 17 pages.

Brant, J.A. and A.E. Childress, Assessing short-range membrane-colloid interactions using surface energetics. Journal of Membrane Science, 2002. 203(1): p. 257-273.

Busnaina, A. A., Elsawy, T. (1998). The Effect of Relative Humidity on Particle Adhesion and Removal. Proceedings of the 21st Annual Meeting of the Adhesion Society, 1998. Georgia, USA. pp. 315-317.

Busnaina, A. A., Elsawy, T. (1998). The Measurement of Particle Adhesion Forces in Humid and Dry Environments. Proceedings of the 21st Annual Meeting of the Adhesion Society, 1998. Georgia, USA. pp. 394-397.

Cahn, J.W. and J.E. Hilliard, Free energy of a nonuniform system. I. Interfacial free energy. The Journal of chemical physics, 1958. 28(2): p. 258-267.

Calvo, G., et al., Decreasing ore grades in global metallic mining: A theoretical issue or a global reality? Resources, 2016. 5(4): p. 36.

Cappella, B. and G. Dietler, Force-distance curves by atomic force microscopy. Surface science reports, 1999. 34(1-3): p. 15-3104.

Cleaver, J. A. S., Tyrrell, J. W. G. (2004). The Influence of Relative Humidity on Particle Adhesion—a Review of Previous Work and the Anomalous Behaviour of Sodalime Glass. Kona, No. 22.

D. E. Packham, "Surface Energy, Surface Topography & Adhesion," International Journal of Adhesion Adhesives, vol. 23, pp. 437-448, 2003.

D. I. Verrelli, W. J. Bruckard, P. T. L. Koh, M. P. Schwarz and B. Follink, "Influence of Particle Shape and Roughness on the Induction Peried for Particle-Bubble Attachment," in XXVI International Mineral Processing Engineering Congress—IMPC, New Delhi, 2012, pp. 05665-05676.

D. K. Owens and R. C. Wendt, Journal of Applied Polymer Science, vol. 13, Abstract, 1 page, 1969.

Della Volpe, C. and S. Siboni, Acid-base surface free energies of solids and the definition of scales in the Good-van Oss-Chaudhury theory. Journal of Adhesion Science and Technology, 2000. 14(2): p. 235-272.

Della Volpe, C. and S. Siboni, Some reflections on acid-base solid surface free energy theories. Journal of Colloid and Interface Science, 1997. 195(1): p. 121-136.

Della Volpe, C., et al., The solid surface free energy calculation: I. In defense of the multicomponent approach. Journal of Colloid and Interface Science, 2004. 271(2): p. 434-453.

Demkowicz, L. and Gopalakrishnan, J. (2017). Discontinuous Petrov-Galerkin (DPG) Method. In Encyclopedia of Computational Mechanics Second Edition (eds E. Stein, R. Borst and T.J.R. Hughes). Abstract. https://doi.org/10.1002/9781119176817.ecm2105.

Demkowicz, L. and J. Gopalakrishnan, Analysis of the DPG method for the Poisson equation. SIAM Journal on Numerical Analysis, 2011. 49(5): p. 1788-1809.

Drago, R.S., A modern approach to acid-base chemistry. J. Chem. Educ, 1974. 51(5): pp. 300-307.

Drelich, J. and E. Chibowski, Superhydrophilic and superwetting surfaces: definition and mechanisms of control. Langmuir, 2010. 26(24): p. 18621-18623.

F. M. Fowkes, Industrial and Engineering Chemistry, vol. 56, 1964, 1 page.

Farshchi-Tabrizi, M., Kappl, M., Butt, H. (2008) Influence of Humidity on Adhesion: An Atomic Force Microscope Study. Journal of Adhesion Science and Technology, 22, pp. 181-203. [13] Zimon, A. D. (1982). Adhesion of dust and powder. Chapter IV. Consultants Bureau, New York.

Feiler, A. A., Jenkins, P., Rutland, M. W. (2005). Effect of relative humidity on adhesion and frictional properties of micro- and nano-scopic contacts. J. Adhesion Sci. Technolo., vol. 19, No. 3-5, pp. 165-179.

Good, R.J. and C.J. van Oss, The modern theory of contact angles and the hydrogen bond components of surface energies (Chapter 1), in Modern approaches to wettability. 1992, Springer. p. 1-27.

Hamaker, H., The London—van der Waals attraction between spherical particles. physica, 1937. 4(10): p. 1058-1072.

Hansen, C.M., Hansen solubility parameters: a user's handbook. 2007: CRC press. 123 pages.

Harnby, N., Hawkins, A. E., Opalinski, I. (1996). Measurement of the adhesional force between individual particles with moisture present Part 2: A Novel Measurement Technique. Chemical Engineering Research and Design, 74 A, pp. 616-626.

Jensen, M., Petersen, J., Schultz, C., Kellar, J. and Cross, W. Ink Formulation and Printing of Superhydrophobic Paper. in Printing for Fabrication, Society for Imaging Science and Technology. 2017. 3 pages. Denver, Co.

Johnson, K. L, Kendall, K., Roberts, A. D. (1971). Surface energy and the contact of elastic solids. Proceedings of the Royal Society A, 324, 301-313.

Jones, R. Pollock, H. M., Cleaver, J. A. S., Hodges, C. (2002). Adhesion forces between glass and silicion surfaces in air studied by AFM: Effects of relative humidity, particle size, roughness, and surface treatment. Langmuir, 18, pp. 8045-8055.

Kappl, M. and H.J. Butt, The colloidal probe technique and its application to adhesion force measurements. Particle & Particle Systems Characterization, 2002. 19(3): p. 129-143.

Kellar, J.J., Functional Fillers and Nanoscale Minerals: New Markets/new Horizons. 2006: SME. 4 pages.

Kellar, J.J., M.A. Herpfer, and B.M. Moudgil, Functional Fillers and Nanoscale Minerals. 2003: Society for Mining Metallurgy. 2 pages.

Leja, J., Surface Chemistry of Froth Flotation. Surface Chemistry of Froth Flotation. 1982: Springer. pp. 758.

Lyu, Z., Chai, J., Xu, Z., Qin, Y., Cao, J. (2019) A Comprehensive Review on Reasons for Tailings Dam Failures Based on Case History. Advances in Civil Engineering, vol. 2019, 18 pages.

Madeira, D. M. F., Vieira, O., Pinheiro L. A., & Carvalho, B. d. M. (2018). Correlation between surface energy and adhesion force of polyethylene/paperboard: a predictive tool for quality control in laminated packaging. Hindawi International Journal of Chemical Engineering, 2018, Article ID 2709037, 7 pages, https://doi.org/10.1155/2018/2709037.

Marti, O., Modern tribology handbook, (Chapter 17. Measurement of Adhesion and Pull-Off Forces with the AFM). 2000: CRC press.

McFarlane, J. S., Tabor, D. (1950). Adhesion of solids and the effect of surface films. Proceedings of the Royal Society A, 202, 224-243.

Mishchenko, L., et al., Design of ice-free nanostructured surfaces based on repulsion of impacting water droplets. ACS nano, 2010. 4(12): p. 7699-7707.

(56) References Cited

OTHER PUBLICATIONS

[NeverWet. Rust Oleum Incorporated. Oct. 19, 2017]; Available from: http://www.neverwet.com/new/index.php. 2 pages.

Ong, Q.K. and I. Sokolov, Attachment of nanoparticles to the AFM tips for direct measurements of interaction between a single nanoparticle and surfaces. Journal of colloid and interface science, 2007. 310(2): p. 385-390.

Petersen, J., et al. Upconverting Nanoparticle Security Inks Based on Hansen Solubility Parameters. in NIP & Digital Fabrication Conference. 2015. Society for Imaging Science and Technology.

Petersen, J.B., et al., Hansen solubility parameters of surfactant-capped silver nanoparticles for ink and printing technologies. Langmuir, 2014. 30(51): p. 15514-15519.

Quesnel, D.J., R.S. Rimai, and L.H. Sharpe, Particle adhesion: applications and advances (Chapter—Atomic Force Microscope Technique for Adhesion Measurements by D.F Schaefer and J. Gomez). 2002, pp. 341-359: CRC Press.

R. J. Good and L. A. Girifalco, The Journal of Physical Chemistry, vol. 64, p. 561, 1960.

Rabinovich, Y. I., Adler, J. J., Esayanur, M. S., Ata, A., Singh, R. K., Moudgil, B. M. (2002). Capillary forces between surfaces with nanoscale roughness. Advances in Colloid and Interface Science, 96, pp. 213-230.

Schultz, J., Nardin, M, Determination of the Surface Energy of Solids by the Two-Liquid-Phase Method, in Modern Approaches to Wettability. 1992, Springer. p. pp. 73-100.

Vunnam, S., et al., Surface modification of indium tin oxide for direct writing of silver nanoparticulate ink micropatterns. Thin Solid Films, 2013. 531: p. 294-301.

W. A. Zisman, "Relation of Equilibrium Contact Angle to Liquid and Solid Constitution," Advances in Chemistry Series, vol. 43, pp. 1-51, 1961.

Wang, Z., M. Elimelech, and S. Lin, Environmental applications of interfacial materials with special wettability. Environmental science & technology, 2016. 50(5): p. 2132-2150.

Ward, D. Thermodynamic Parameters for Predicting Adhesion Between Functional Polyethylene to Polystyrene Copolymers. in 2006 PLACE Conference http://www.tappi.org/content/enewsletters/eplace/2007/06PLA72.pdf. 2006. Cincinnati, OH. 14 pages.

Webb, M., H. Ruber, and G. Leduc, The toxicity of various mining flotation reagents to rainbow trout (*Salmo gairdneri*). Water Research, 1976. 10(4): p. 303-306.

Yang, L. Hu, J., Bai, K. (2016). Capillary and van der Waals force between microparticles with different sizes in humid air. Journal of Adhesion Science and Technology, 30, No. 5, pp. 566-578.

Zafar, U., et al., Drop test: A new method to measure the particle adhesion force. Powder Technology, 2014. 264: p. 236-241.

Zhang, L., et al., Inkjet printing for direct micropatterning of a superhydrophobic surface: toward biomimetic fog harvesting surfaces. Journal of Materials Chemistry A, 2015. 3(6): p. 2844-2852.

Zhang, X., L. Wang, and E. Levänen, Superhydrophobic surfaces for the reduction of bacterial adhesion. Rsc Advances, 2013. 3(30): p. 12003-12020.

* cited by examiner

SEPARATION OF PARTICLES OF DIFFERENT SURFACE ENERGIES THROUGH CONTROL OF HUMIDITY

PRIORITY STATEMENT

This application claims priority to U.S. Provisional Patent Application No. 63/074,616 filed on Sep. 4, 2020, titled SEPARATION OF PARTICLES OF DIFFERENT SURFACE ENERGIES THROUGH CONTROL OF HUMIDITY, all of which is hereby incorporated by reference in their entirety.

GRANT REFERENCE

This invention was made with government support under NSF1805550 awarded by the National Science Foundation. The government has certain rights in the invention.

FIELD OF THE INVENTION

The present disclosure relates to humidity and its effect on the surface energies of particles. More particularly, but not exclusively, the present disclosure relates to the separation of particles of different surface energies through the control of humidity.

BACKGROUND

Many of the methods to classify and concentrate minerals and the subsequent extraction of metals takes place in water-based environments (aqueous solutions). These processes include hydrocyclone classification, gravity-based concentration methods, froth flotation and leaching. In this regard, the consumption of water in the mineral industry can be on the order of 1.5 to 3.5 $m^3$ of water per metric ton of ore processed. Compounding the use of water results in subsequent issues presented by storage of moisture-laden tailings in dams.

Therefore, sustainable processing of the present disclosure (based upon differing adhesive forces) through the reduction of water consumption will become a key factor to make mining operations viable in the long term.

SUMMARY

Therefore, it is a primary object, feature, and/or advantage of the present disclosure to improve on the state of the art and overcome the deficiencies within the art.

It is a further object, feature, or advantage of the present disclosure is to provide a method and system for separating particles of different surface energies through control of relative humidity (RH).

It is a still further object, feature, or advantage of the present disclosure to provide a method and system for separating particles of different surface energies through control of humidity that uses less water than convention separation technologies.

Another object, feature, or advantage is to provide a method and system for mining operations for separating minerals of different surface energies through control of humidity within a separation environment.

Yet another object, feature, or advantage is to provide a viable, long term solution to classify and concentrate minerals.

Still another object, feature, or advantage is to provide a new method and process for classifying and concentrating particles (both mineral and non-mineral types) that can be used in combination with existing methods and processes.

In an aspect of the present disclosure, a method for separating particles of different surface energies through control of humidity is disclosed. The method includes, for example, in at least one aspect, the steps of providing a separation platform with a controlled environment for separating a plurality of particles, identifying one or more particle types to separate from the plurality of particles, controlling humidity within the controlled environment based on one or more properties of the one or more particles, and separating the one or more particle types from the plurality of particles by controlling the humidity within the controlled environment based on the one or more properties of the one or more particles.

In another aspect of the present disclosure, a system for separating particles of different surface energies through control of humidity is disclosed. The system includes, for example, a separation platform with a controlled environment for separating a plurality of particles, an intelligent controller operably connected to a data store, the separation platform, and one or more actuators, one or more properties of the plurality of particles accessible to the intelligent controller and the data store, and one or more operating conditions for the controlled environment accessible to the intelligent controller and the data store. In a preferred aspect, the separation platform identifies one or more particle types to separate from the plurality of particles, controls the one or more operating conditions for the controlled environment based on one or more properties of the one or more particles for separating one or more particle types from the plurality of particles.

In another aspect of the present disclosure, a method for classifying and concentrating minerals and the subsequent extraction of metals is disclosed. The method includes, for example, in at least one aspect, the steps of providing one or more known particle separation processes, performing a particle separation process on an input to or an output of the one or more known particle separation processes, wherein the particle separation process comprises a separation platform with a controlled environment for separating a plurality of particles, identifying one or more particle types to separate from the plurality of particles, controlling humidity within the controlled environment based on one or more properties of the one or more particles, and separating the one or more particle types from the plurality of particles by controlling the humidity within the controlled environment based on the one or more properties of the one or more particles.

In at least one other aspect of the present disclosure, a method for separating particles of different surface energies through control of relative humidity and substrate surface roughness is disclosed. The method includes, for example, in at least one aspect, the steps of providing a separation platform with a controlled environment having a substrate surface roughness for separating a plurality of particles, identifying one or more particle types to separate from the plurality of particles, controlling humidity and the substrate surface roughness within the controlled environment based on one or more properties of the one or more particles, and separating the one or more particle types from the plurality of particles by controlling the humidity and the substrate surface roughness within the controlled environment based on the one or more properties of the one or more particles.

One or more of these and/or other objects, features, or advantages of the present disclosure will become apparent from the specification and claims that follow. No single embodiment need provide each and every object, feature, or advantage. Different embodiments may have different objects, features, or advantages. Therefore, the present disclosure is not to be limited to or by any objects, features, or advantages stated herein.

BRIEF DESCRIPTION OF THE DRAWINGS

Illustrated embodiments of the disclosure are described in detail below with reference to the attached drawing figures, which are incorporated by reference herein, and where.

BRIEF DESCRIPTION OF THE TABLES

Figure 1:
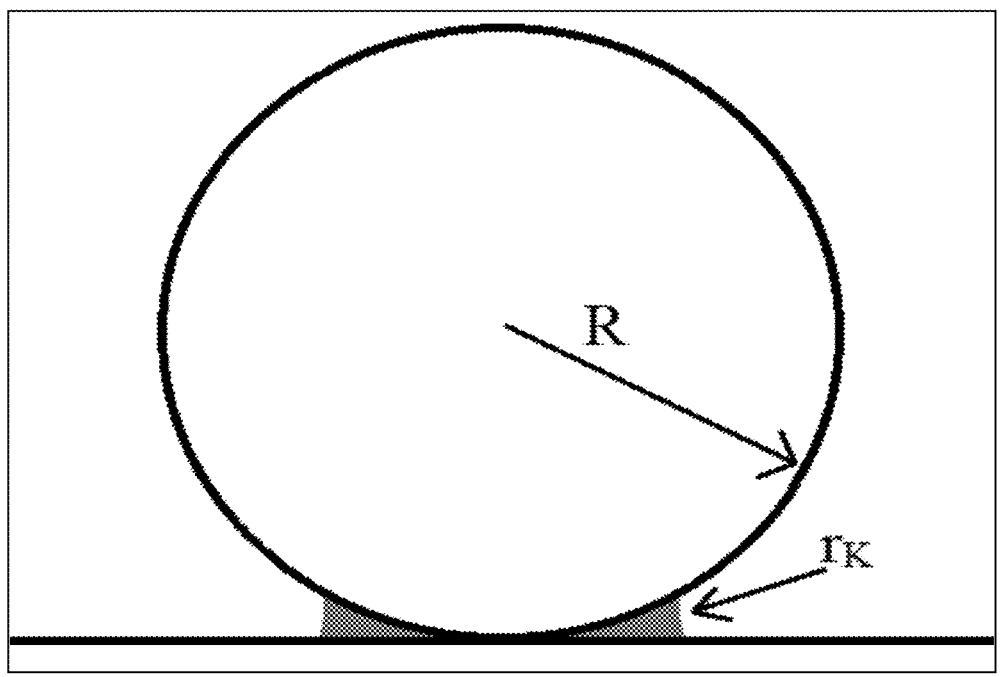
FIG. 1 is an exemplary schematic diagram representing the capillary of a sphere and a flat surface.

Illustrated embodiments of the disclosure are described in detail below with reference to the attached tables, which are incorporated by reference herein, and where:

Table 1 is a summary of experimental studies of the influence of RH on a sphere on flat surface systems;

Table 2 provides results of interfacial energy calculations for different RH levels for TCOD treated particles and plasma cleaned substrates;

Table 3 provides results of interfacial energy calculations for different RH levels for plasma cleaned particles and plasma cleaned substrates;

Table 4 provides results of interfacial energy calculations for different RH levels for TCOD treated particles and TCOD treated substrates; and Table 5 provides dimension and surface roughness of a mesh.

DETAILED DESCRIPTION

The present disclosure contemplates many different aspects for a method and system for separating particles of different surface energies through control of humidity. Representative applications of methods and systems are described in this section. These examples are being provided solely to add context and aid in the understanding of the described aspects of the disclosure. It will thus be apparent to one skilled in the art that the described aspects of the disclosure may be practiced without some and/or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and show, by way of illustration, specific embodiments in accordance with the methods and systems of the present disclosure. Although aspects of the disclosure are described in sufficient detail to enable one skilled in the art to practice the described embodiments, it is understood that these examples are not limiting; other aspects may be used, and changes may be made without departing from the spirit and scope of the described aspects of the disclosure.

1.0 INTRODUCTION

Many of the methods to classify and concentrate minerals and the subsequent extraction of metals takes place in water-based environments (aqueous solutions). These processes include, for example, hydrocyclone classification, gravity-based concentration methods, froth flotation and leaching. In this regard, the consumption of water in the mineral industry can be on the order of 1.5 to 3.5 $m^3$ of water per metric ton of ore processed. Compounding the use of water is the subsequent issues presented by storage of moisture-laden tailings in dams. Thus, sustainable processing through the reduction of water consumption will become a key factor to make mining operations viable in the long term.

Froth flotation is the most common aqueous-based process to concentrate minerals with different surface properties. Specifically, particle wettability is the main property that influences the interaction between air bubbles and mineral surfaces. A hydrophobic mineral surface will adhere to air bubbles and be carried to the water/air interface, forming a mineralized froth. Minerals with hydrophilic surface character will not adhere to air bubbles. Thus, the governing mechanism for flotation is adhesion (or not) between the air bubble and the mineral particle. However, the flotation process requires tremendous amounts of water to achieve the desired concentrate grade.

The differences in adhesive forces between particles and a flat substrate have been investigated with the goal of development of a sustainable particle concentration system. Toward this end, many of the concepts associated with flotation mineral surface treatments have been utilized without the need for the continuous aqueous phase or water-based environment being present. Key to the methods and systems of the present disclosure is a means to measure particle adhesive forces, and an understanding of the forces involved. In this regard, there are various techniques that have been applied to measure adhesive forces and the techniques used herein will be discussed subsequently. When a dry particle is in contact with a dry surface, the primary adhesion forces involved are the van der Waals and electrostatic forces. According to known practices, the van der Waals forces can be heightened by increasing the contact area between particle and surface, i.e. causing deformation on either the particle or the substrate. This is not the case in at least one aspect of the present disclosure since the particles and substrates used were rigid, and the deformation was neglected as it is expected to be small.

In humid environments, capillary condensation of liquids (e.g., water, although other liquids are contemplated) can occur between the particle and substrate. FIG. 1 shows an example of capillary condensation between a spherical particle and a flat surface. The presence of capillary condensation engenders a capillary force, which is large compared to the van der Waals force and the electrostatic force. Thus, the relevant adhesive forces present in this particle/surface system are: van der Waals adhesion force ($F_{vdw}$), electrostatic image force ($F_{ei}$) and capillary force ($F_c$), represented by Equations 1 to 3, respectively.

$$F_{vdw} = \frac{AR}{6z^2}, \tag{1}$$

$$F_{ei} = \frac{Q}{6(D+z)^2}, \tag{2}$$

$$F_c = 4\pi R \gamma_{LV}, \tag{3}$$

Where A is the Hamaker constant, R is the radius of the spherical particle, z is the separation distance (also taken as 4 Å), Q is the charge carried by the particle, D is the particle diameter, and $\gamma_{LV}$ is the surface tension of the condensed liquid. In at least one aspect, to obtain the pull-off force related to the capillary force, $F_c$ (Equation 3), it is necessary to consider the area where the Laplace pressure has influence. From the Kelvin equation, the Laplace pressure and the area have inverse dependence on the Kelvin radius ($r_K$). Therefore, Equation 3 is independent of relative air humidity. However, experimentation by others tends to suggest that the adhesion increases as the humidity increases. Thus, Equation 3 is contradicted. This is likely because of assumptions made in the derivation of Equation 3 related to the vapor pressure used in the Kelvin equation. A review of the influence of relative humidity on particle adhesion from various studies in the art indicated that the roughness on the surface of the substrate and on the particle hinder the adsorption of water at the particle/substrate interface. Some studies concluded that increasing roughness decreased adhesion. The decrease in adhesion happens when the thickness of the film of water at the interface is on the same order of magnitude as of the asperity height. In these cases, there are in fact many points of contact between the rough particle with the flat surface, or between the smooth particle and the rough surface, causing a decrease in adhesion. This aspect of the present disclosure is expected to be very important when crushed minerals are evaluated. For purposes of illustration, the exemplary experiments performed with glass beads that will be presented in the present disclosure, the roughness effect was neglected.

Exemplary experiments conducted using an atomic force microscope (AFM) with a glass sphere (R≈10 μm) at the tip of the AFM cantilever on polished silicon wafers (roughness of 1-2 nm) showed a variation in adhesion between a glass sphere and a silicon wafer. Specifically, a threshold in adhesion was observed around 60% relative air humidity (RH). Above this value, the adhesion force increased significantly. The pull-off force was approximated by Equation 3.

Similar behavior was achieved in experiments conducted on other exemplary systems. In one aspect, polystyrene latex (PSL) spheres (22 μm diameter) were deposited on polished silicon wafers. Here, the silicon wafer was rotated at 8,500 rpm for 120 seconds, generating detachment forces (drag force, lift force and centrifugal force). This procedure was repeated with humidity ranging from 10% to 90%.

In this case it was rationalized that at low relative humidity values the charge build-up is predominant, since PSL particles are insulators and silicon wafer is a semi-conductor. A gradual increase in the adhesion force when the RH varied from 45% to 80% was seen and a steep increase in the adhesion force was seen when the RH varied from 80% to 85% this occurred due to capillary condensation (increasing capillary force). In this example, the PSL is hydrophobic and the substrate is hydrophilic. The steep increase occurs at a greater relative humidity (80% versus 60%) than for the silica-based system, possibly because of the difference in hydrophobic character between the two systems.

Figure 2A:
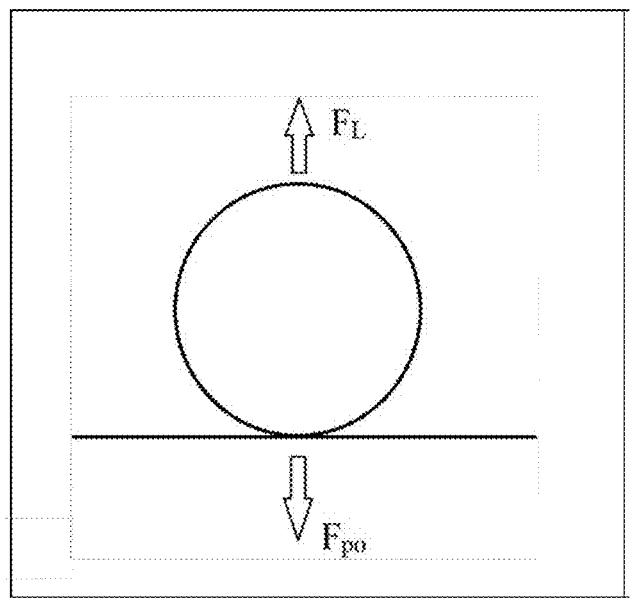
FIGS. 2A-2B are a schematic diagram representing removal and adhesive forces involved in a low relative humidity environment and in a high relative humidity environment in accordance with an exemplary aspect of the present disclosure.
Figure 2B:
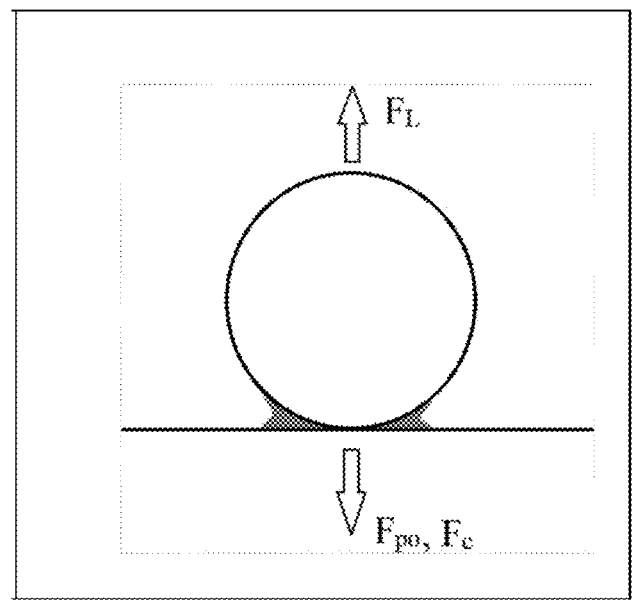

For the case where spherical particles are sitting on a flat surface, a normal tensile force can cause separation if the lift-off force is greater than the adhesive forces. FIG. 2 shows the forces involved in low and high relative humidity environments.

Here $F_{po}$ is the pull-off force given by the Johnson-Kendall-Roberts (JKR) model, represented by Equation 4.

$$F_{po} = \tfrac{3}{4} W_a d \tag{4}$$

Where $W_a$ is the thermodynamic work of adhesion and d is the particle diameter. The lift-off force required to remove the particle from the surface is then: $F_{po} + F_c$. Other methods to calculate the force necessary to remove the particles were used and are contemplated in the present disclosure and discussed here, and in more detail under the Materials and Methods heading.

Various studies by others investigated the influence of RH in particle adhesion. The measurement techniques used in various studies includes, for example, pendulum testing, deflection of fibers, centrifugal testing, use of electro-balances and AFM, with RH varying from 0% to 100%. Other exemplary studies have been investigated. A table that encompassing findings of the present disclosure are shown, by way of example, in Table 1. Only the parameters comparable to the work presented in the present disclosure are shown in Table 1. The first comparison was the size of the particles involved. For example, in froth flotation a common size range is 10 µm and 150 µm—however, for completeness, studies with a top size of 1 mm were included in Table 1. The second relative comparison shown in Table 1 is the particle/substrate interaction. Finally, it should be noted that computer simulations were performed by research in the art comparing other works also indicated the influence of RH in the particle adhesion.

TABLE 1

Summary of experimental studies of the influence of RH on a sphere on flat surface systems

| Authors | Measurement Technique | Contact Geometry | Materials | RH range |
|---|---|---|---|---|
| McFarlane and Tabor | Pendulum | Sphere-flat | Glass spheres 0.25 mm to 1 mm in diameter | 78%-100% |
| Zimon | Centrifuge Pulsed vibration | Sphere-flat | Glass spheres 30 µm to 70 µm in diameter Flat surface of glass, quartz and steel | 25%-90% |
| Harnby et al. | Particle array and microbalance | Particle-flat | Glass particles 80 µm to 460 µm and sand particles on brass, glass or stainless-steel surface. | 20%-98% |
| Berard et al. | AFM | Particle on flat | Zanamivir drug 10 µm to 100 µm on lactose compact | 0%, 32%, 85% |
| Jones et al. | AFM | Sphere on flat | Si probe tip and glass microsphere (40 µm to 200 µm in diameter) on glass silicon flat. | 0%-90% |
| Rabinovich et al. | AFM | Sphere on flat | Glass spheres 20 µm to 40 µm in diameter on treated silica flat surfaces | 0%-80% |
| Feiler et al. | AFM | Sphere on flat | Glass beads 20 µm in diameter on silicon wafers | 5%-88% |
| Farshchi-Tabrizi et al. | AFM | Sphere on flat | Borosilicate glass beads 4 µm in diameter; Silica microspheres 3.5 µm in diameter | 0%-100% |

Figure 3:
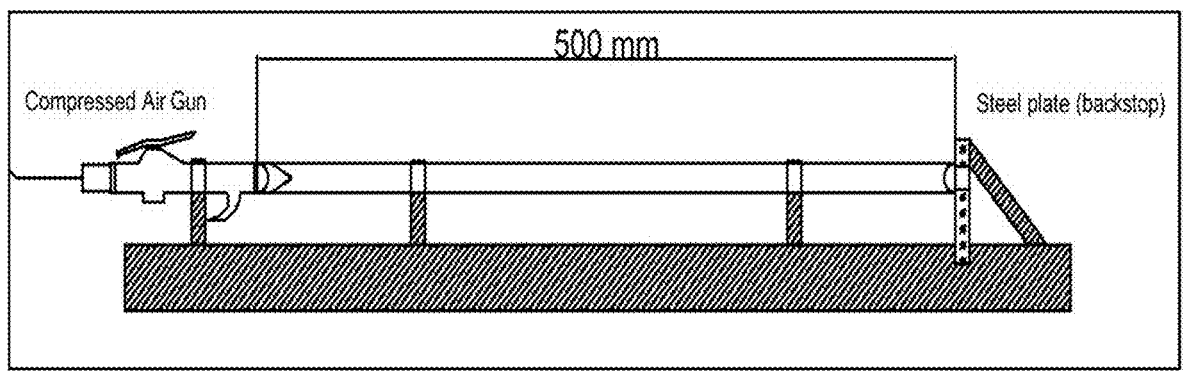
FIG. 3 is a schematic of impact test apparatus in accordance with an exemplary aspect of the present disclosure.
Figure 12:
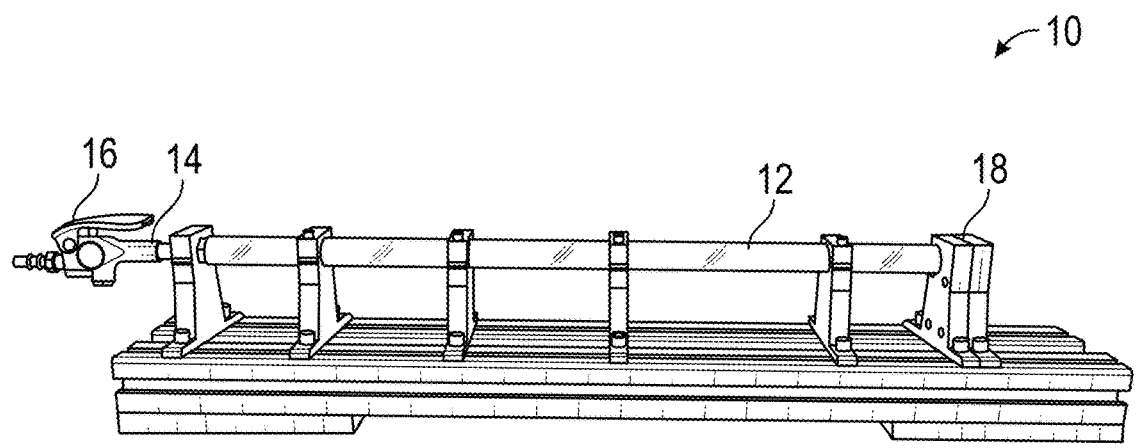
FIGS. 12-16 are images of an exemplary impact test apparatus, humidifier chamber, and humidity sensor in accordance with an exemplary aspect of the present disclosure.
Figure 13:
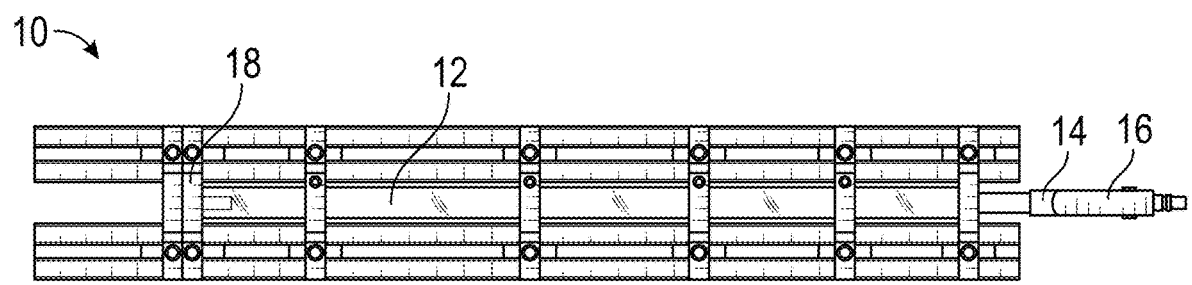
Figure 14:
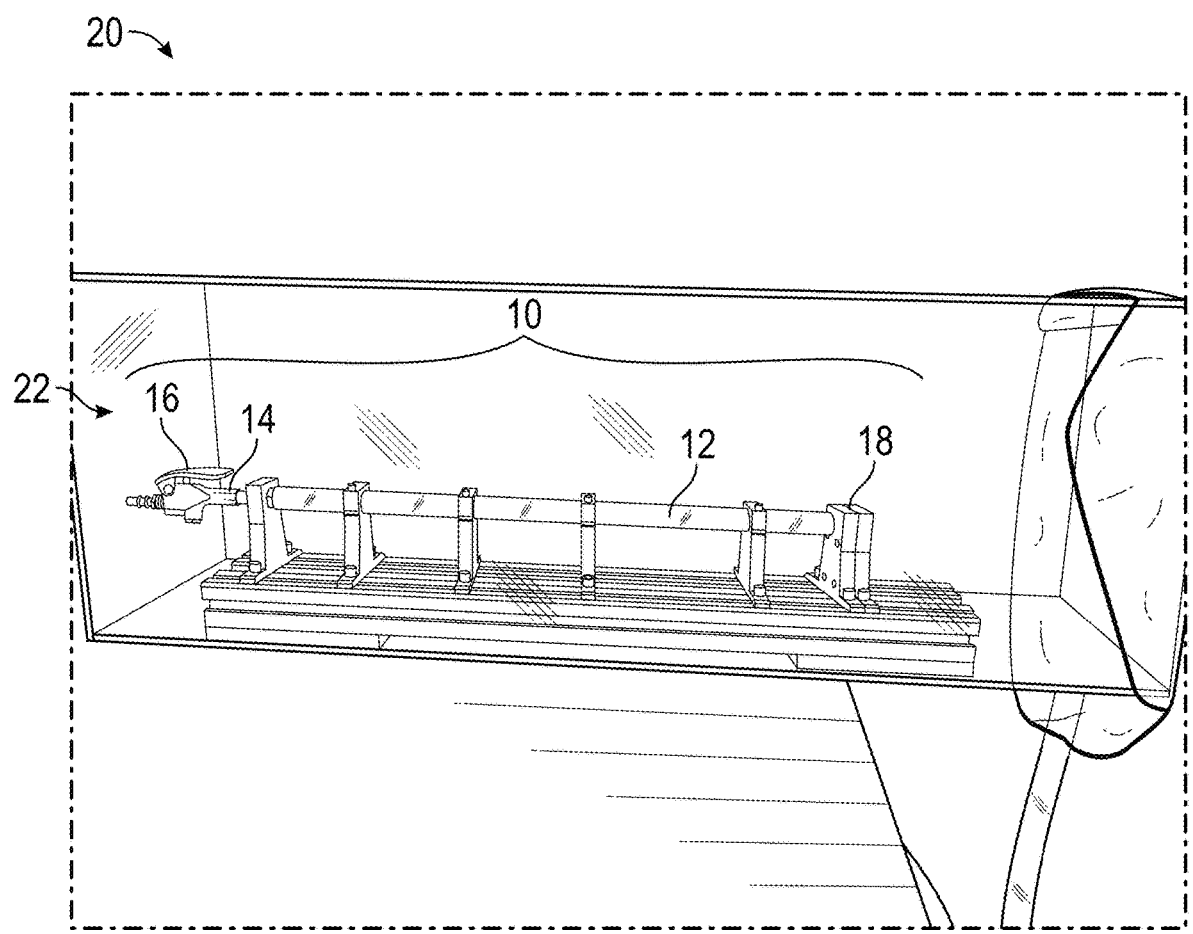
Figure 15:
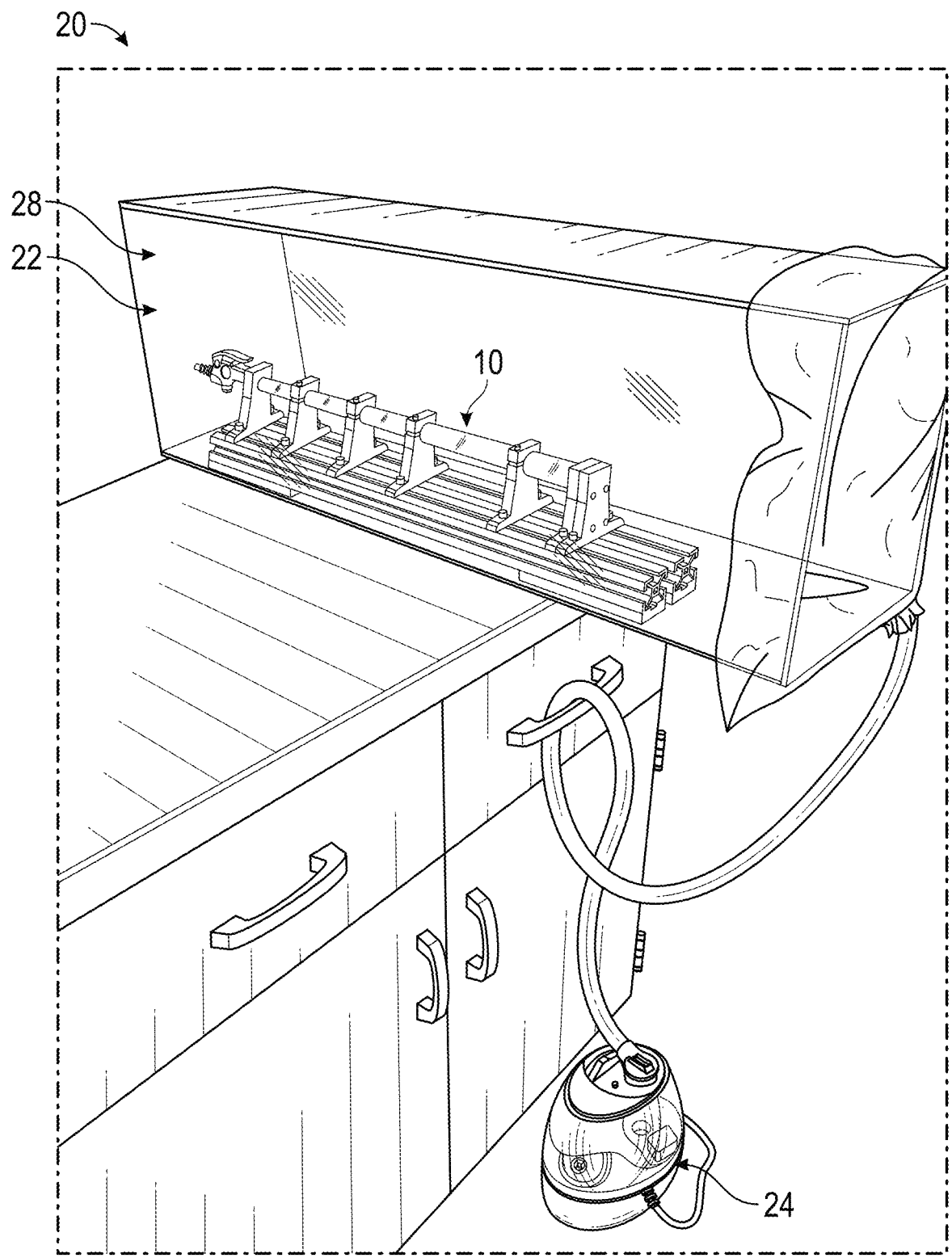
Figure 16:
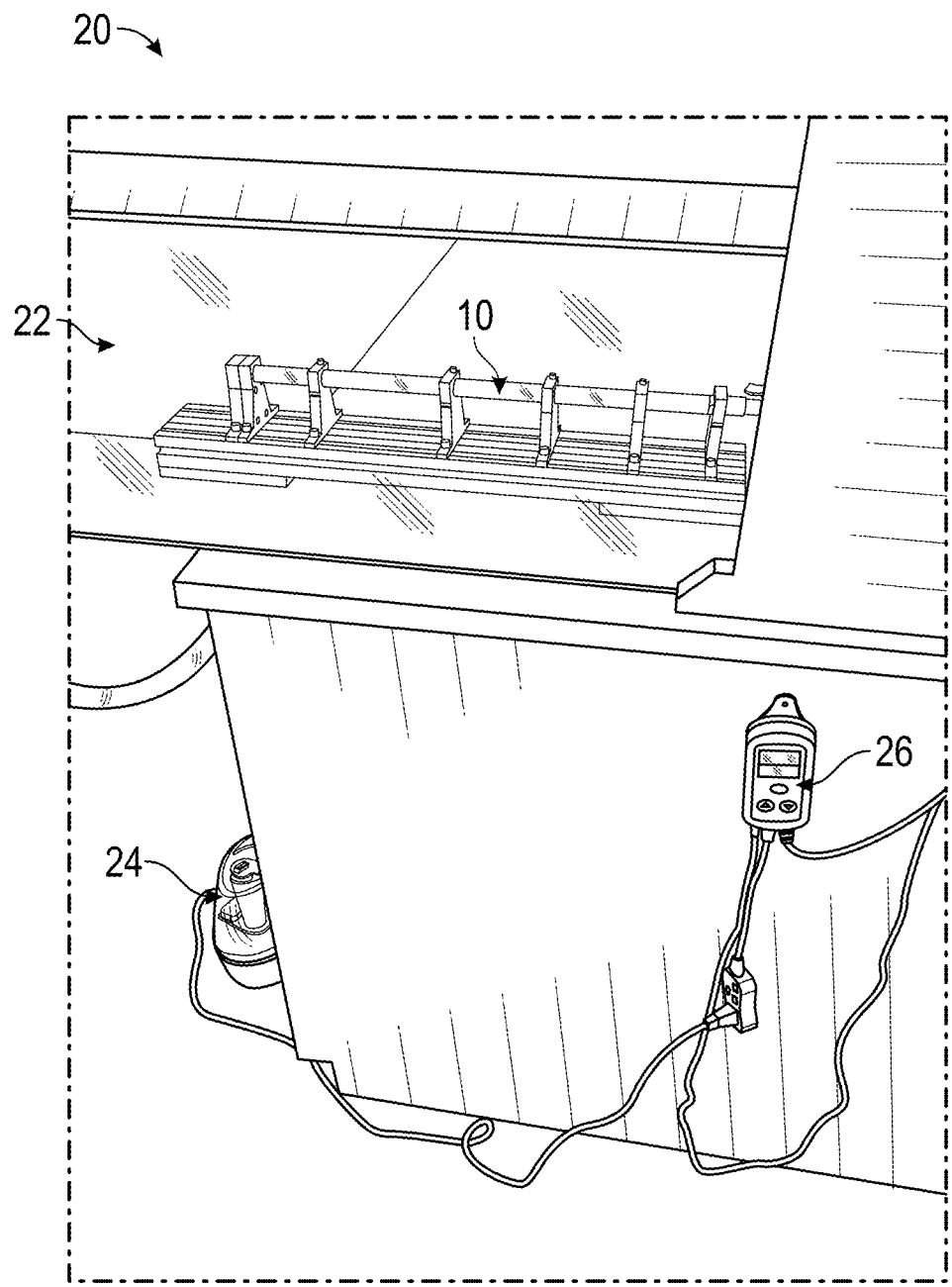

With this background information, the objective of the present disclosure is to identify separation windows in which control of relative air humidity yields different substrate adhesion for hydrophilic and hydrophobic particles of different values of interfacial energy. Others have used a mechanical approach to measure particle interfacial energies. In such research the RH in which the experiments were performed was reported (between 45% and 60% RH), but this parameter was not deliberately controlled. A similar mechanical approach was used, for purposes of illustration, in the present disclosure; however, unlike the work done by others, relative humidity was controlled and varied for the measurement of particle separation. Therefore, a primary object of the present disclosure is to determine whether particles with different surface properties (hydrophobic and hydrophilic), and hence different adhesive forces, can be separated as a function of RH.

2.0 MATERIALS AND METHODS

This section sets forth exemplary materials and methods in accordance with one or more illustrative aspects of the present disclosure. As presented herein, the interfacial energy was determined based on an earlier impact test, which was modified to achieve the objectives of the present disclosure. In at least one example, a glass disk with the desired treatment was glued to an aluminum stub (25 mm long and 15 mm in diameter). A monolayer of glass spheres acquired from PolyScience (size range between 10 and 150 μm and density of 2.48 g/cm$^3$) was dispersed on the substrate. This size range was chosen because it is comparable to the size range of various types of minerals often encountered in mineral beneficiation, such as silicates, sulfides, sulfates, oxides, hydroxides, carbonates, phosphates, halides, and native elements. Imaging of the disk and the beads was performed using an optical profilometer (Keyence VK 200) prior to the impact test. After initial imaging, the stub is placed in the testing apparatus 10. The aluminum stub was propelled through a glass tube 12 using an air compressor 14 with a pressure regulator 16. The pressure was adjusted in order to achieve the desired velocity inside a horizontal tube 12 with maximum (preferred) length of 50 cm, although other lengths are contemplated. An aluminum backstop 18 with an opening of 12 mm was placed at the end of the glass tube 12. Other backstop and opening sizes are contemplated. The stub accelerated and impacted on the backstop 18 against the opening at the end of the tube. To record the velocity of impact and the duration of impact, a high-speed camera (IDT MotionProY Series 4) was used at 70,000 fps. FIGS. 3 and 12-13 show a schematic diagram of the testing equipment 10.

Equations (5) to (7) were used, where $F_{ad}$ is the JKR adhesive force, $\Gamma$ is the interfacial energy and R is the particle radius of the largest particle left on the substrate to calculate the interfacial energy between two bodies. Equation (6) calculated the detachment force caused by a deacceleration of a given particle of mass m, where $F_{det}$ is the detachment force, $\Delta t$ is half of the time of impact (i.e., half of the time of contact between stub and backstop) and v is the impact velocity. The interfacial energy was then estimated from Equation (7), with $F_{det}=F_{ad}$.

$$F_{ad} = \frac{3}{2}\pi R \Gamma, \quad (5)$$

$$F_{det} = \frac{m\Delta v}{\Delta t} \quad (6)$$

$$\Gamma = \frac{m\Delta v}{\Delta t \pi R}\frac{2}{3} \quad (7)$$

For the cases when the adhesive force is greater than the detachment force ($F_{ad}>F_{det}$), at a given particle size, the particles will not detach from the disk. When the adhesive force is equal to the detachment force, a critical particle size can be identified. The critical particle size is used in Equation 7 to calculate the interfacial energy.

Figure 11:
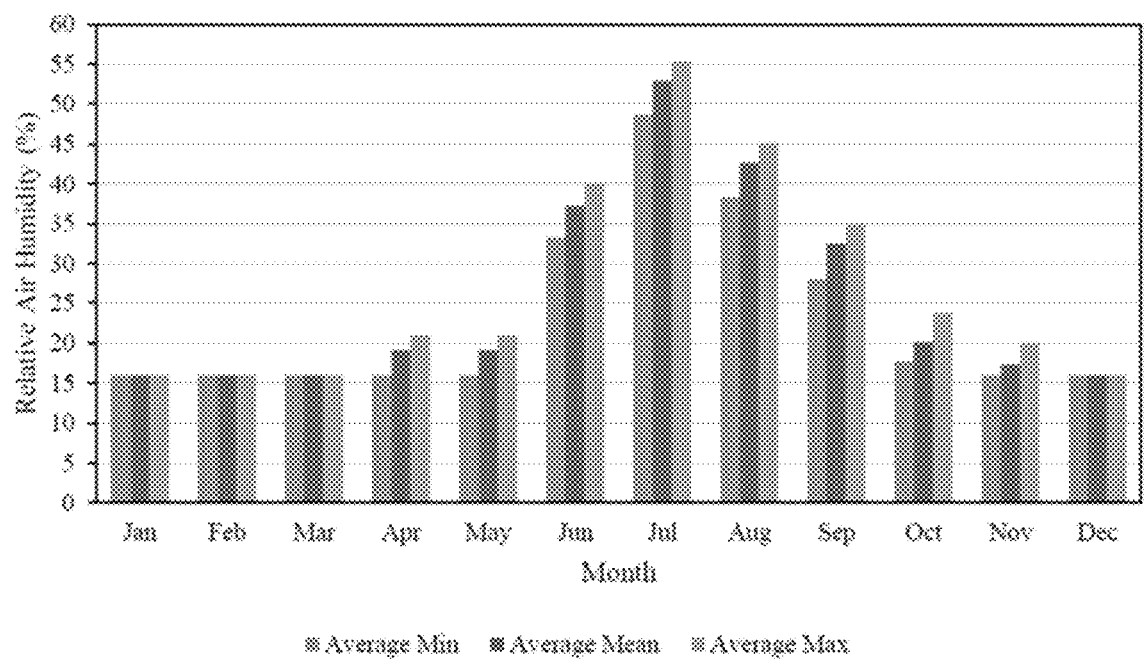
FIG. 11 is a plot illustrating relative air humidity measured average by month in 2019.

Initial adhesion testing was conducted with no humidity control. It was found that the relative humidity fluctuated daily and the fluctuations were largely seasonal. For example, the average humidity measured inside the laboratory varied from 16% during the winter, to 55% during the summer. Measured relative air humidity levels are shown, by way of example, in FIG. 11. Consequently, the testing apparatus 10 (FIGS. 3 & 14-16) was placed inside a transparent polycarbonate chamber 22 to create a controlled humidity environment testing system 20. Other environments for controlling humidity are also contemplated. In one exemplary aspect, humidity was fed into the chamber using a humidifier 24 (Homasy Model HM161B) that was plugged into a controller 16 (Inkbird Humidity Controller IHC200) capable of measuring relative air humidity from 5% to 99%. To decrease the humidity inside the chamber a renewable silica-gel-based dehumidifier (Eva-Dry E-500) was used. The humidity controller 26 was set to the desired level, the sensor then turned the humidifier on and turned it off as soon as the desired humidity was achieved. With the humidifier 24 it is possible to increase the tested humidity above seasonal maximums, such as 55% humidity and exploit the interaction between surface treatments and water present in the air, in order to determine the effect of humidity on the ability to separate particles based upon adhesive forces.

In at least one exemplary aspect of the present discourse, and to ensure that the particles and substrates would be conditioned to the set relative air humidity, the particles were sprinkled over the glass and left inside the chamber 12 for at least 30 minutes prior to testing to allow all of the particles to contact the moisture in the air. The glass was glued on top of an aluminum stub and the test was performed as described earlier. For tests under controlled air humidity, two different glass treatments were used: plasma cleaned glass (hydrophilic and higher surface energy) and trichloro (octadecyl)silane (TCOD) (hydrophobic and lower surface energy). The purpose of using these two treatments, in accordance with at least one aspect of the present disclosure, was to compare the response of the interaction between hydrophilic surfaces, hydrophobic surfaces and a combination of hydrophobic particles and hydrophilic substrates.

At least one example of a TCOD treatment was performed mixing 0.7 ml of TCOD and 20.0 ml of toluene for each gram of glass treated. The solution was then mixed for 2 hours in a beaker. After the solution mixing, the glass specimens were dried at 150° C. for 2 hours. To ensure that the hydrophobic treatment was effective, the contact angle between a drop of water and a glass disk was measured. For the glass beads, a fraction of beads was put in contact with water. The plasma cleaned glass beads would sink when in contact with water, and the TCOD treated beads would float/not mix with water.

Also, two different types of particles were placed on the same glass disk, in a way that it was possible to compare two treatment types under the same velocity of impact and duration of impact. Imaging of the beads on the disk was performed before and after the tests using the same profilometer mentioned in the previous section. The beads that remained attached to the disk after the impact were analyzed and the diameter was measured using ImageJ.

3.0 RESULTS AND DISCUSSION

For the plasma cleaned glass beads and plasma cleaned glass disks, the interfacial energy was calculated by applying Equation 7 and varying the RH from 16% to 79%. For the TCOD treated beads and TCOD treated disks, the interfacial energy was calculated for RH levels from 16% to 63%. The results of these tests are shown in Tables 3 and 4, respectively.

Figure 4:
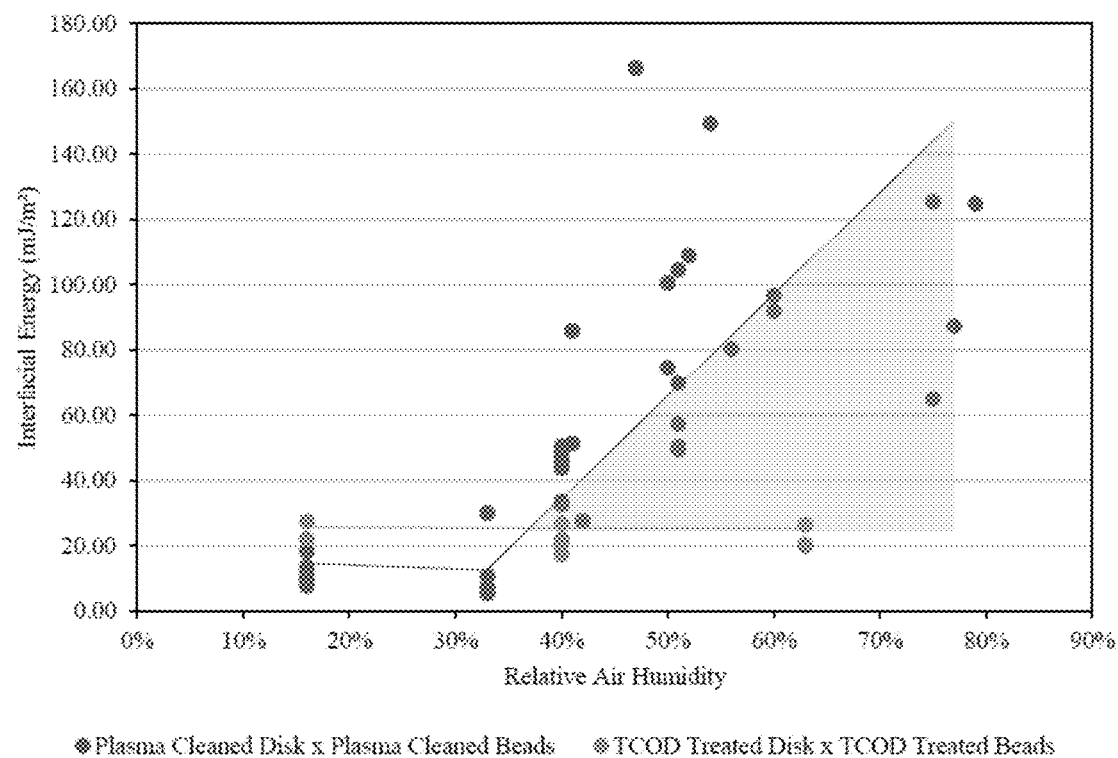
FIG. 4 is plot illustrating the results of interfacial energy for different surface treatments at varying RH in accordance with an exemplary aspect of the present disclosure.

FIG. 4 graphically shows the results of the two surface treatments as a function of RH. It can be seen that the interfacial energy of plasma cleaned treated (hydrophilic and high surface energy) material is dependent on RH. Between 16% and 33% RH there is no significant change in the interfacial energy for the plasma cleaned (hydrophilic) particles. As the RH increases beyond 33%, the interfacial energy increases quite linearly from an average of 13.4 mJ/m² to 124.8 mJ/m² at 79% RH. Thus, it is possible to compare this behavior with the results from prior work, where at an RH threshold the capillary force will overcome the van der Waals force and hold the particles more strongly than the contact forces. In a subsequent investigation this effect was determined using an AFM where a maximum or continuous increase of adhesion force with increasing RH for hydrophilic surfaces was found.

With respect to the TCOD treatment, with the RH varying from 16% to 63%, there is relatively little change associated with the interfacial energy of this surface treatment.

The interfacial energy varied from 17.2 to 27.5 mJ/m². Exemplary literature values for this surface treatment indicate that TCOD coated surfaces should have a surface tension between 20 to 24 mJ/m².

Therefore, at RH values beyond ~35%, a separation window was explored by using the surface interaction of different surface treatments and properties to achieve a separation of particles. The first two analyses compare the same type of surface treatment for the substrate and particles. In order to evaluate the separation of particles with different surface properties in a single system, tests were performed using only plasma cleaned disks as substrate and having the two different types of beads treatment (plasma cleaned and TCOD) as particles.

Figure 5:
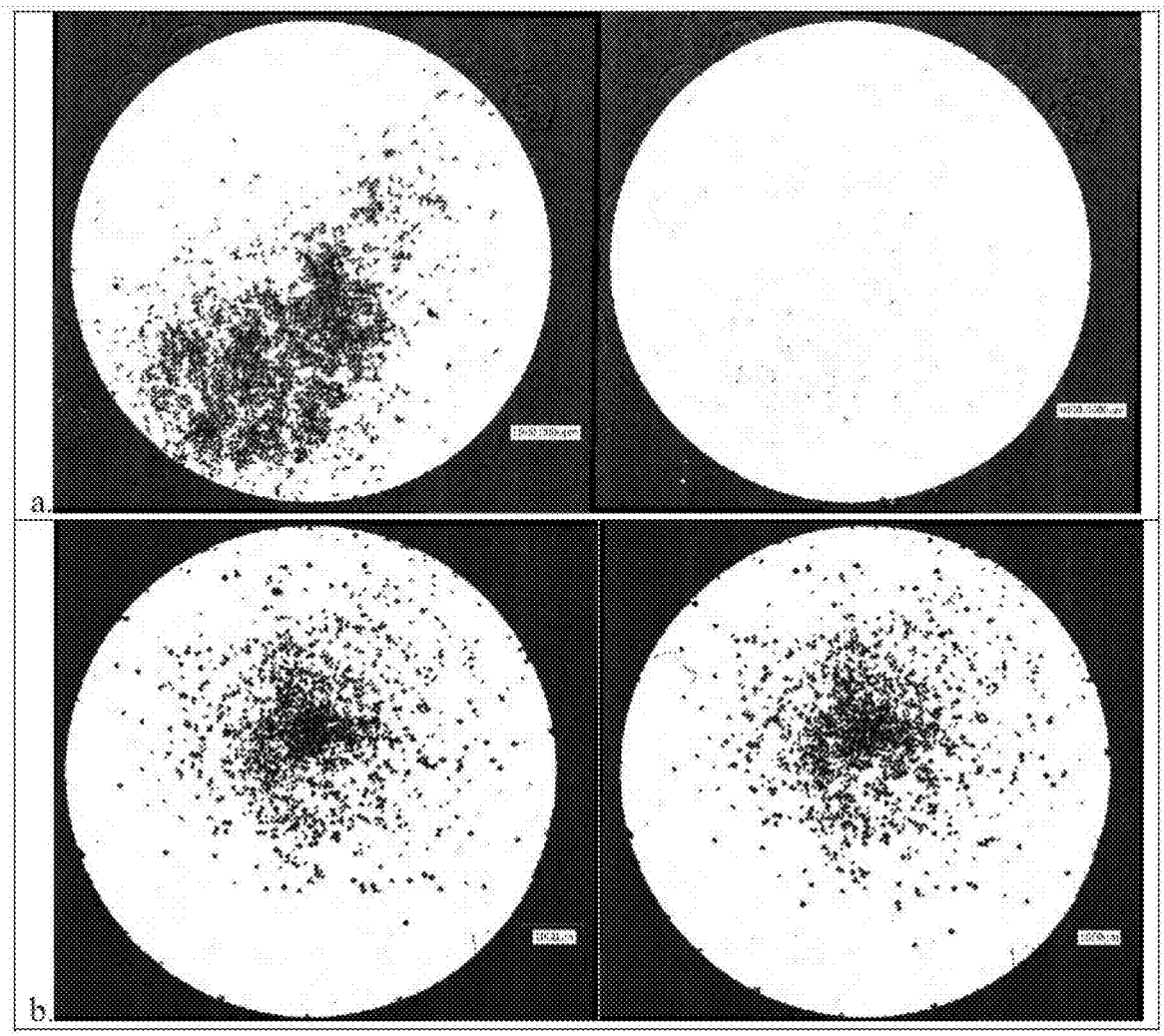
FIG. 5 is an image of plasma cleaned beads on a plasma cleaned disk before (left) and after (right) the impact at (a.) 16% RH and (b.) 75% RH in accordance with an exemplary aspect of the present disclosure.
Figure 6:
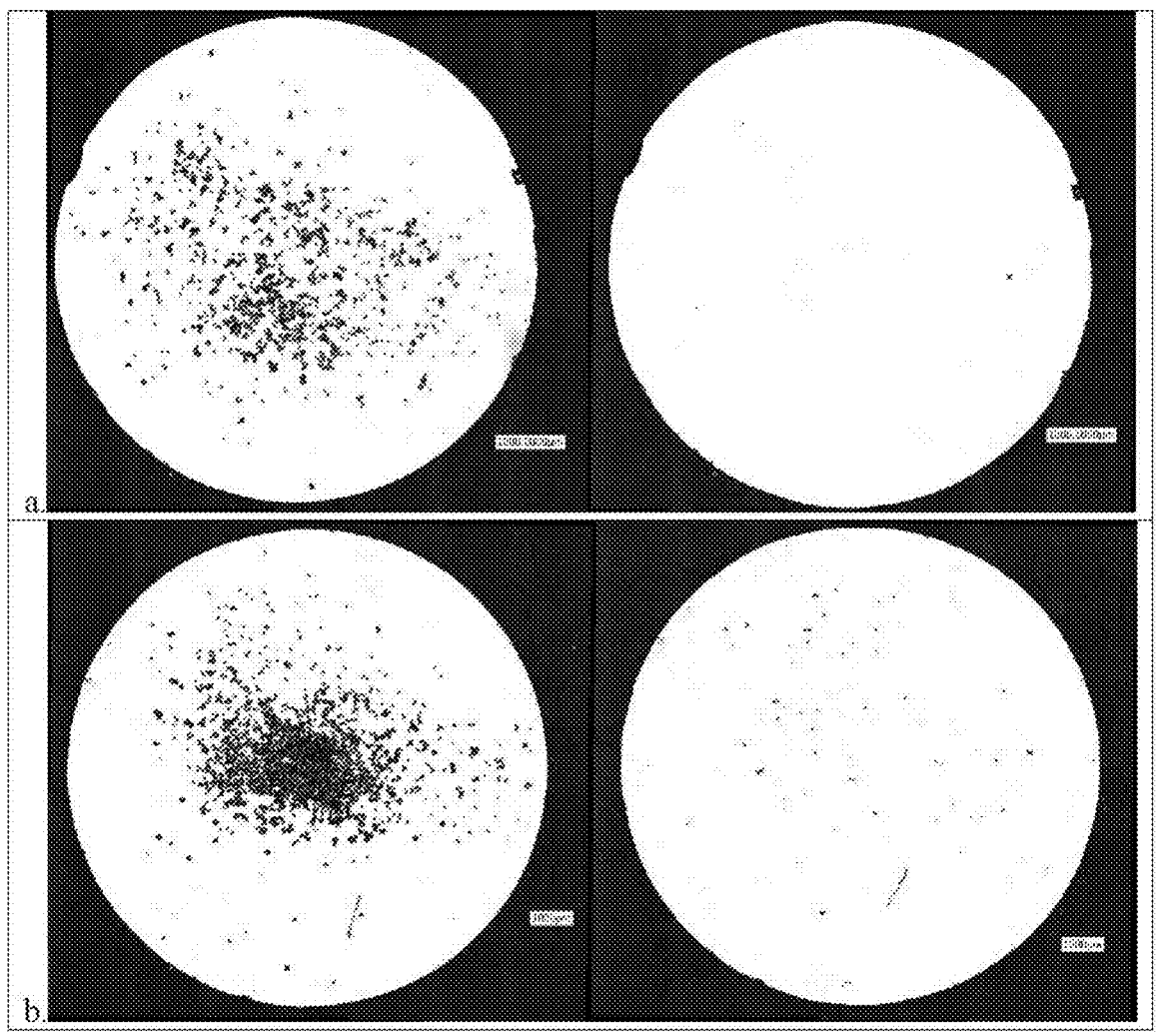
FIG. 6 is an image TCOD treated beads on TCOD treated disk before (left) and after (right) the impact at (a.) 16% RH and (b.) 63% RH in accordance with an exemplary aspect of the present disclosure.

To help demonstrate how RH impacts the adhesive forces, the difference for the hydrophilic and higher surface energy treatment for the hydrophobic and lower surface energy treatment are shown in FIGS. 5 and 6. FIG. 5 shows a plasma cleaned disk with plasma cleaned beads before and after the impact at a) 16% RH and at b) 75% RH. FIG. 6 shows a TCOD treated disk with TCOD treated beads before and after the impact at a) 16% RH and at b) 63% RH. The visual before-and-after inspection clearly demonstrates the influence of RH on particle adhesion.

Nevertheless, for the TCOD treated material, capillary condensation may occur for the hydrophobic systems.

A third group of tests was performed, with plasma cleaned (hydrophilic) and TCOD particles (hydrophobic) sharing the same substrate, a plasma cleaned glass disk (hydrophilic). This 'mixed' system was chosen to help demonstrate the possibility of an actual mineral separation using a common substrate. Due to the limitations associated with the optical microscope used (featureless, same size, same color) surfaces, the particles were placed in different regions on the same disk. The results of interfacial energy at varying RH levels for plasma cleaned disk/substrates and TCOD treated particles are shown in Table 2.

TABLE 2

Results of interfacial energy calculations for different RH levels for TCOD treated particles and plasma cleaned substrates.

| Glass Disk Treatment | Bead Type Treatment | Critical Radius of Particles (m) | Mass of Particle (kg) | Impact Velocity (m/s) | Half of duration of impact (s) | Interfacial Energy (mJ/m$^2$) | Relative Humidity |
|---|---|---|---|---|---|---|---|
| Plasma Cleaned | TCOD | 2.74E−05 | 2.142E−10 | 1.59 | 0.00020 | 13.15 | 41% |
|  |  | 2.67E−05 | 1.988E−10 | 1.59 | 0.00015 | 16.77 | 41% |
|  |  | 2.61E−05 | 1.844E−10 | 1.40 | 0.00014 | 15.48 | 42% |
|  |  | 2.42E−05 | 1.464E−10 | 1.21 | 0.00015 | 10.38 | 45% |
|  |  | 1.62E−05 | 4.428E−11 | 1.49 | 0.00014 | 6.04 | 45% |
|  |  | 2.66E−05 | 1.959E−10 | 1.81 | 0.00014 | 19.82 | 45% |
|  |  | 4.70E−05 | 1.080E−09 | 1.54 | 0.00011 | 65.49 | 50% |
|  |  | 5.06E−05 | 1.350E−09 | 1.75 | 0.00010 | 98.71 | 50% |
|  |  | 3.64E−05 | 5.014E−10 | 1.55 | 0.00013 | 35.12 | 51% |
|  |  | 4.73E−05 | 1.101E−09 | 1.24 | 0.00013 | 47.76 | 52% |
|  |  | 3.73E−05 | 5.369E−10 | 1.45 | 0.00013 | 34.48 | 54% |
|  |  | 5.16E−05 | 1.430E−09 | 1.47 | 0.00015 | 57.75 | 56% |
|  |  | 4.81E−05 | 1.158E−09 | 1.49 | 0.00013 | 59.16 | 56% |
|  |  | 5.17E−05 | 1.437E−09 | 1.46 | 0.00018 | 48.16 | 76% |
|  |  | 5.17E−05 | 1.436E−09 | 1.57 | 0.00017 | 53.97 | 77% |
|  |  | 4.87E−05 | 1.197E−09 | 1.58 | 0.00011 | 72.02 | 79% |

Figure 7:
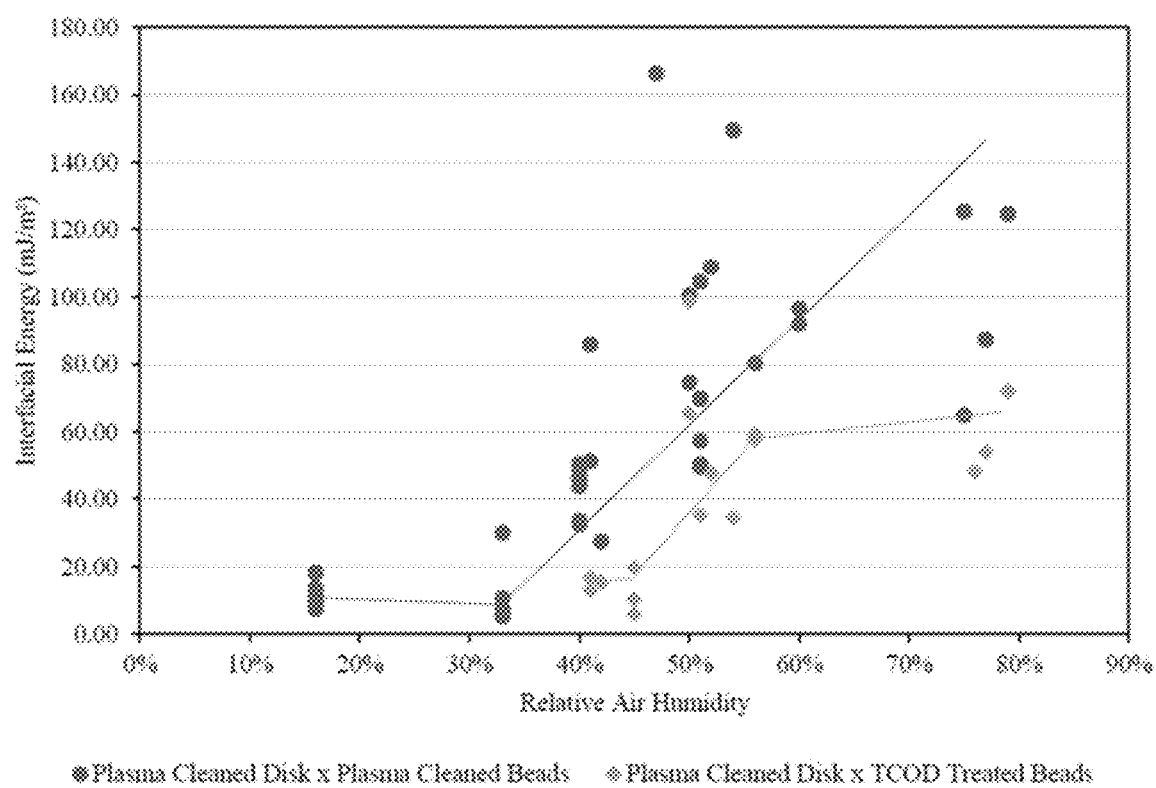
FIG. 7 is a plot illustrating the results of interfacial energy for different particle surface treatments on a plasma cleaned disk at varying RH in accordance with an exemplary aspect of the present disclosure.

FIG. 7 shows the results from Table 2 and Table 3 graphically. It is possible to observe that the interaction of hydrophobic particles and hydrophilic substrate (TCOD treated beads versus plasma cleaned disk) has changed when compared to particles and substrate of the same time (TCOD beads versus TCOD disks). However, and most importantly, there is still a difference of interfacial energy that can be exploited to reach separation of particles with different surface energies.

TABLE 3

Results of interfacial energy calculations for different RH levels for plasma cleaned particles and plasma cleaned substrates.

| Glass Disk Treatment | Bead Type Treatment | Critical Radius of Particles (m) | Mass of Particle (kg) | Impact Velocity (m/s) | Half of duration of impact (s) | Interfacial Energy (mJ/m$^2$) | Relative Air Humidity |
|---|---|---|---|---|---|---|---|
| Plasma Cleaned | Plasma Cleaned | 2.95E−05 | 2.667E−10 | 0.67 | 0.00017 | 7.54 | 16% |
|  |  | 2.55E−05 | 1.723E−10 | 1.46 | 0.00018 | 11.71 | 16% |
|  |  | 2.75E−05 | 2.160E−10 | 1.57 | 0.00014 | 18.27 | 16% |
|  |  | 2.40E−05 | 1.436E−10 | 1.84 | 0.00017 | 13.61 | 16% |
|  |  | 2.20E−05 | 1.106E−10 | 1.65 | 0.00018 | 9.89 | 16% |
|  |  | 2.40E−05 | 1.436E−10 | 1.10 | 0.00015 | 9.35 | 16% |
|  |  | 2.78E−05 | 2.231E−10 | 0.67 | 0.00021 | 5.33 | 33% |
|  |  | 3.88E−05 | 6.083E−10 | 1.48 | 0.00016 | 29.94 | 33% |
|  |  | 2.88E−05 | 2.484E−10 | 1.30 | 0.00022 | 10.77 | 33% |
|  |  | 2.71E−05 | 2.064E−10 | 1,12 | 0.00024 | 7.48 | 33% |
|  |  | 4.48E−05 | 9.367E−10 | 1.72 | 0.00016 | 46.29 | 40% |
|  |  | 4.35E−05 | 8.574E−10 | 1.72 | 0.00016 | 43.75 | 40% |
|  |  | 4.63E−05 | 1.033E−09 | 1.75 | 0.00016 | 50.51 | 40% |
|  |  | 4.78E−05 | 1.136E−09 | 1.59 | 0.00016 | 48.72 | 40% |
|  |  | 4.20E−05 | 7.675E−10 | 1.42 | 0.00016 | 33.61 | 40% |
|  |  | 4.66E−05 | 1.052E−09 | 1.58 | 0.00016 | 45.95 | 40% |
|  |  | 4.11E−05 | 7.190E−10 | 1.50 | 0.00017 | 32.49 | 40% |
|  |  | 7.00E−05 | 3.567E−09 | 1.59 | 0.00020 | 85.78 | 41% |
|  |  | 4.68E−05 | 1.064E−09 | 1.59 | 0.00015 | 51.29 | 41% |

TABLE 3-continued

Results of interfacial energy calculations for different RH levels for plasma cleaned particles and plasma cleaned substrates.

| Glass Disk Treatment | Bead Type Treatment | Critical Radius of Particles (m) | Mass of Particle (kg) | Impact Velocity (m/s) | Half of duration of impact (s) | Interfacial Energy (mJ/m$^2$) | Relative Air Humidity |
|---|---|---|---|---|---|---|---|
| | | 3.48E−05 | 4.383E−10 | 1.40 | 0.00014 | 27.56 | 42% |
| | | 7.12E−05 | 3.745E−09 | 1.70 | 0.00011 | 166.40 | 47% |
| | | 5.11E−05 | 1.388E−09 | 1.75 | 0.00010 | 100.57 | 50% |
| | | 5.02E−05 | 1.311E−09 | 1.54 | 0.00011 | 74.52 | 50% |
| | | 6.28E−05 | 2.578E−09 | 1.55 | 0.00013 | 104.62 | 51% |
| | | 5.16E−05 | 1.428E−09 | 1.23 | 0.00014 | 50.39 | 51% |
| | | 5.00E−05 | 1.301E−09 | 1.15 | 0.00013 | 49.48 | 51% |
| | | 5.80E−05 | 2.030E−09 | 1.34 | 0.00014 | 69.81 | 51% |
| | | 4.93E−05 | 1.244E−09 | 1.15 | 0.00011 | 57.36 | 51% |
| | | 7.15E−05 | 3.792E−09 | 1.24 | 0.00013 | 108.88 | 52% |
| | | 7.75E−05 | 4.844E−09 | 1.45 | 0.00013 | 149.42 | 54% |
| | | 6.18E−05 | 2.447E−09 | 1.43 | 0.00015 | 80.24 | 56% |
| | | 5.04E−05 | 1.329E−09 | 1.48 | 0.00009 | 96.64 | 60% |
| | | 6.56E−05 | 2.931E−09 | 1.39 | 0.00014 | 92.01 | 60% |
| | | 5.89E−05 | 2.126E−09 | 1.09 | 0.00013 | 64.92 | 75% |
| | | 7.03E−05 | 3.609E−09 | 1.23 | 0.00011 | 125.52 | 75% |
| | | 5.83E−05 | 2.062E−09 | 1.41 | 0.00012 | 87.36 | 77% |
| | | 5.97E−05 | 2.212E−09 | 1.47 | 0.00009 | 124.76 | 79% |

Notably, as the plasma cleaned beads on a plasma cleaned surface/substrate interfacial energy continues to rise (see results from Table 3) with the increase in relative humidity.

Because the substrate is now hydrophilic and has higher surface energy, the hydrophobic particles have a different behavior at high RH levels, compared to the data shown in FIG. 4 (common particle/substrates), which shows the results from Table 3 and Table 4.

TABLE 4

Results of interfacial energy calculations for different RH levels for TCOD treated particles and TCOD treated substrates.

| Glass Disk Treatment | Bead Type Treatment | Critical Radius of Particles (m) | Mass of Particle (kg) | Impact Velocity (m/s) | Half of duration of impact (s) | Interfacial Energy (mJ/m$^2$) | Relative Air Humidity |
|---|---|---|---|---|---|---|---|
| TCOD | TCOD | 4.93E−05 | 1.241E−09 | 1.07 | 0.00021 | 27.50 | 16% |
| | | 4.18E−05 | 7.588E−10 | 1.39 | 0.00024 | 22.12 | 16% |
| | | 3.09E−05 | 3.078E−10 | 1.72 | 0.00014 | 26.82 | 40% |
| | | 2.49E−05 | 1.598E−10 | 1.80 | 0.00014 | 17.22 | 40% |
| | | 2.66E−05 | 1.956E−10 | 1.76 | 0.00014 | 20.27 | 40% |
| | | 2.53E−05 | 1.687E−10 | 1.78 | 0.00011 | 21.98 | 40% |
| | | 2.86E−05 | 2.425E−10 | 1.13 | 0.00010 | 20.40 | 63% |
| | | 4.13E−05 | 7.302E−10 | 1.16 | 0.00016 | 26.44 | 63% |
| | | 2.85E−05 | 2.398E−10 | 1.19 | 0.00011 | 19.93 | 63% |

Figure 8:
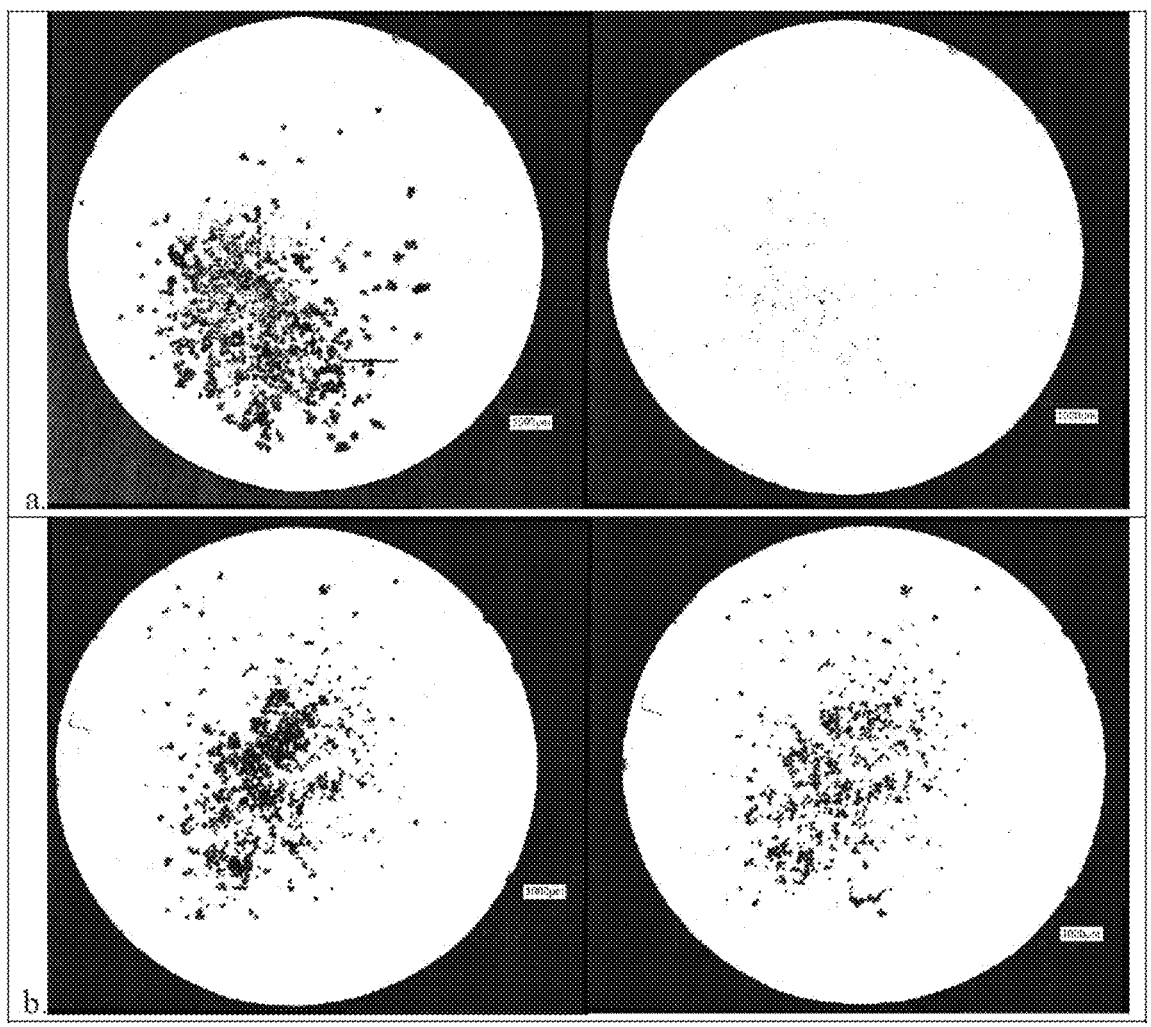
FIG. 8 is an image of TCOD treated beads on plasma cleaned disk before (left) and after (right) the impact at (a.) 50% RH and (b.) 75% RH in accordance with an exemplary aspect of the present disclosure.

FIG. 7 shows that between 56% and 77% RH the increase in interfacial energy plateaus. The quantity of particles that remained attached after impact can be seen in FIG. 8, which shows a plasma cleaned disk with TCOD treated beads before and after the impact at a) 16% RH and at b) 75% RH.

Figure 9:
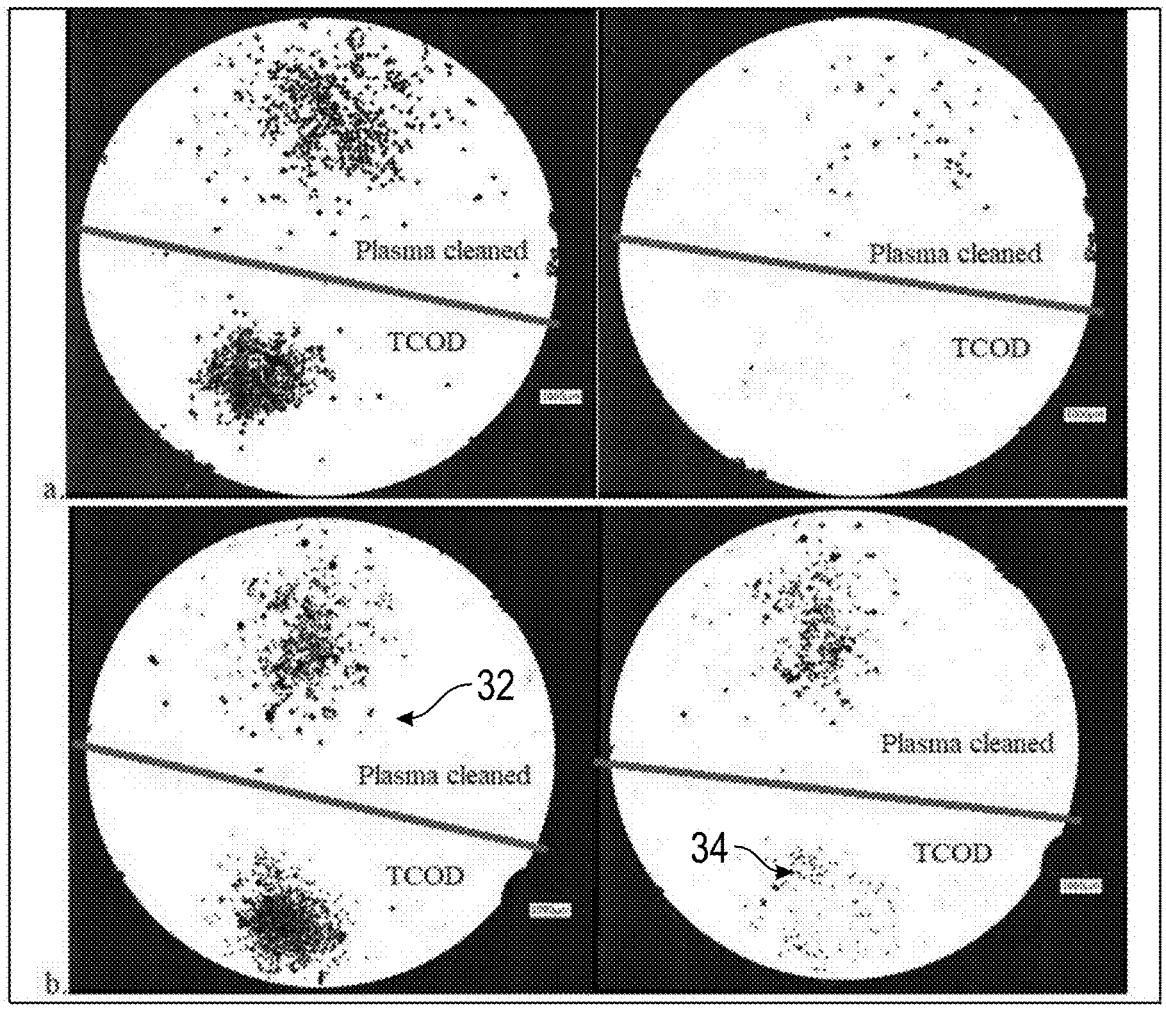
FIG. 9 is an image of TCOD treated beads and plasma cleaned beads on plasma cleaned disk before (left) and after (right) the impact at a) 37% RH and b) 52% RH in accordance with an exemplary aspect of the present disclosure.

From FIG. 7 it can be ascertained that the best separation parameter would be between 55% and 75% RH. However, from FIG. 8, at 75% RH, a considerable amount of TCOD treated beads remained attached after the impact. Few TCOD treated beads were present after testing at 50% RH. Thus, a series of tests between 45% and 55% RH was performed to evaluate the separation and recovery of particles with different surface treatment on the same substrate. Plasma cleaned beads were poured on the upper region and TCOD treated beads were poured on the lower region of the same substrate. FIG. 9 shows the results of tests at a) 37% RH and b) 52% RH.

As expected, as the RH increases, the adhesion of hydrophobic particles on the hydrophilic substrate increases. Using Image J, it was possible to measure the area covered by the particles before and after the impact with the objective to estimate the recovery of particles retained using Equation 8. The recovery was calculated as follows:

$$\text{Recovery} = \frac{\text{Area occupied by the beads after impact}}{\text{Acrea occupied by the beads before impact}} \quad (8)$$

Figure 10:
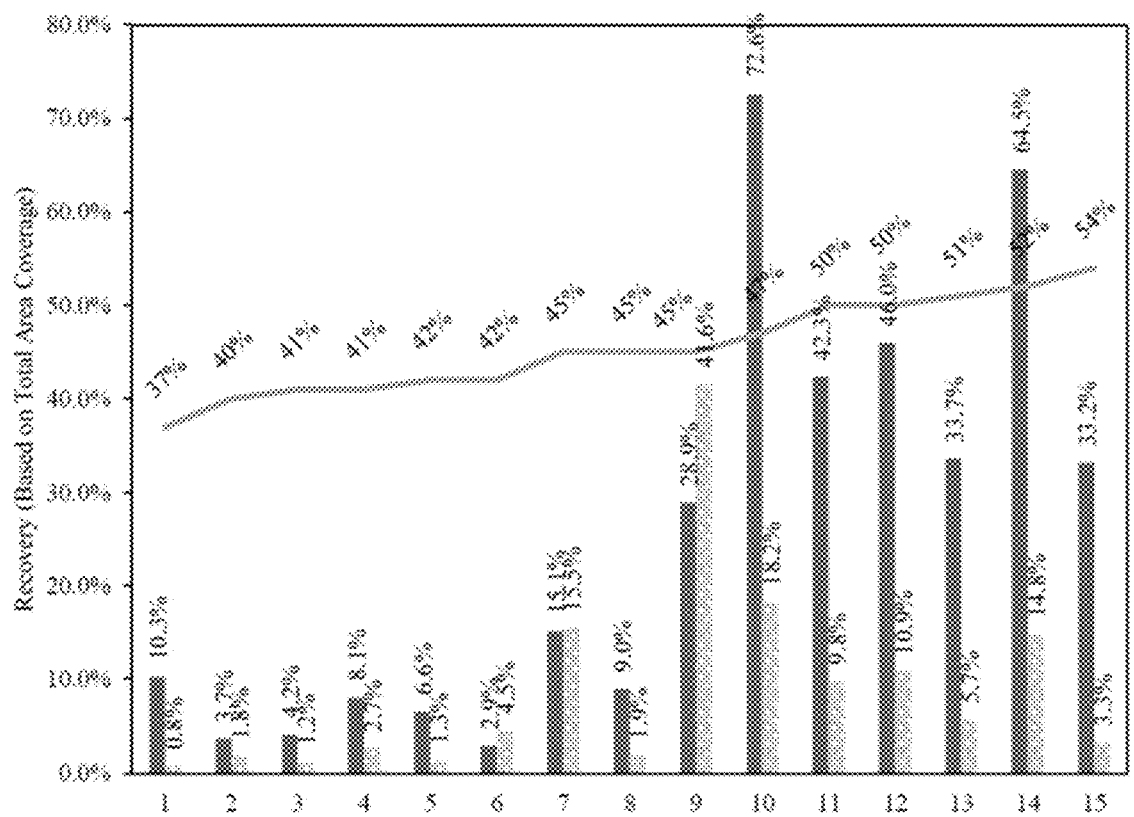
FIG. 10 is a plot illustrating the recovery of particles with varying RH in accordance with an exemplary aspect of the present disclosure.

At least on object of the present disclosure is to have a good recovery of plasma cleaned particles (considerable quantity of beads remaining attached after the impact) and a low recovery of TCOD treated particles (few low-surface-energy particles remaining). FIG. 10 shows the results of the tests from 37% to 54% of RH.

Examination of FIG. 10 shows that the recovery of plasma cleaned particles is relatively small when the RH is between 37-45%. However, when the RH is between 45-54% the recovery increases. For the tests between 47% and 54% the recovery of plasma cleaned particles was, on average, five times greater than the recovery of TCOD treated particles. These results indicate that a method of particle separation can be exploited in controlled relative air humidity environments for particles with different adhesive properties.

The present disclosure contemplates methods for evaluating the separation of mineral particles with different surface properties; as well as sustainable methods to modify particle surfaces in order to achieve separation for a given ore. It is at least one object of the present disclosure to provide particle separation methods and systems that address the consumption of water, since the water consumed to control RH in a room is smaller than the consumption of water by flotation process. In addition, the present disclosure contemplates particle separation methods and systems based on the effect of surface roughness of various particles.

4.0 CONCLUSIONS

An impact test apparatus, methods and systems can be used to determine the interfacial energies of a model system with varying relative air humidity. The behavior of the interfacial energy with varying RH is comparable to other methods used. It was observed that capillary condensation did increase the adhesive forces of hydrophilic materials. A separation window was identified and the differences in interfacial energy for a hydrophilic surface and for a hydrophobic surface can be exploited in order to achieve the separation of particles.

When in contact with a hydrophilic substrate, hydrophobic particles can be attached more strongly due to capillary condensation with higher-surface-energy substrates. In the cases where two different types of particles were under the same test conditions, plasma cleaned particles showed a higher recovery in 80% of the tests when the RH varied from 37% to 54%. And the recovery of the plasma cleaned particles proved to be five times greater, on average, when compared to the TCOD treated particles for RH between 47% and 54%. In at least one aspect of the present disclosure, measurements can be used in the development of sustainable methods and systems that uses little water to separate and concentrate fine minerals. In at least one exemplary aspect, data can be coupled with computer simulations in order to predict ideal conditions to achieve mineral separation. Also, in another exemplary aspect, a lab scale separator can be designed to determine the efficacy of mineral separations based upon adhesive forces with controlled relative humidity.

Since the surface energy is the sum of the different energy components—dispersion forces, polar forces, hydrogen bonding, metallic bonding—per unit area, when one surface is ideally flat and this surface is at the interface with another surface (from a particle or other material) that is also ideally flat, the interfacial area is simply defined as A. Unfortunately, most surfaces are not perfectly flat nor are the particles that are in contact with the substrate. Thus, there is a degree of roughness in most surfaces.

Figure 17:
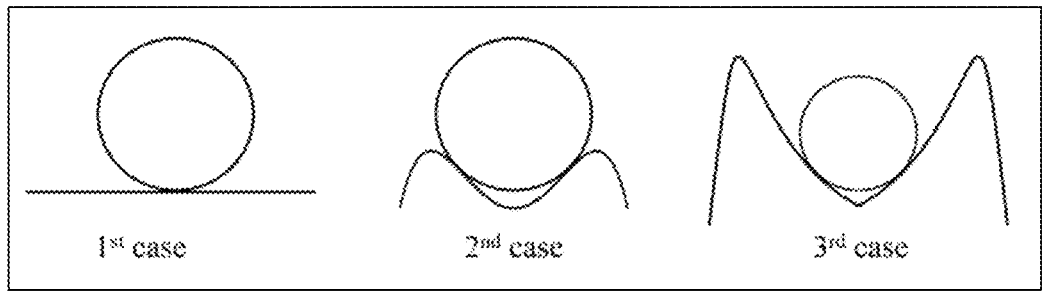
FIG. 17 are images of different cases of particle adhesion of rough surfaces in accordance with an exemplary aspect of the present disclosure.

A. D. Zimon in Adhesion of Dust and Powder discussed three cases of particles residing on rough surfaces. The first case being the contact of a spherical particle and an ideally smooth surface; the second case is of a spherical particle which has dimensions larger than the asperities of the rough surface; and the third case is where the dimensions of the particle are smaller than the asperities of the rough surface. These three cases are shown schematically in FIG. 17.

In all three cases, as the area of contact increases, the adhesive force increases. Zimon assumed a uniform distribution of contacts between the particle and asperities, and as shown in Equation 9, determined the adhesive force ($F_{ad}$) as related to the number of contacts (represented by i) between the particle and the surface.

$$F_{ad} = iF_{ad}{}^i \qquad (9)$$

Also, the number of contacts is related to the equivalent radius of curvature, as introduced by Zimon. The effective contact radius was introduced to evaluate the influence of surface roughness on adhesion. In Equation 10, the effective contact radius takes into account the roughness of the contiguous bodies, as determined by the formula:

$$r_e = \frac{r_1 r_2}{r_1 + r_2} \qquad (10)$$

The radius of the particle and surface asperity will influence the capillary force, which is affected by the roughness of the contiguous surfaces. The capillary force shown in Equation 11 can be written as:

$$F_c = 2\pi R \gamma_{LV} r \cos \theta_i \qquad (11)$$

In the case where a smooth spherical particle is in contact with a rough surface the number of contacts is either one, two or three. The presence of capillary condensation will then occur in one to three points of contact. Assuming an approximation of the contact of one rough particle (ground mineral) on a smooth surface the number of contacts can also vary from one to three points of contact; here the capillary condensation can occur in one to three points of contact, increasing the adhesive forces.

The above equations were used to evaluate the interaction of particles on substrates with varying magnitudes of roughness. The objective was to identify separation windows of particles of different surface energies on rough surfaces. Particle surface treatment, relative air humidity and surface roughness levels were controlled in order to achieve separation of different particles by applying removal forces.

Following the impact test procedures first developed and performed by Zafar et al. and later modified by Sansao et al., the impact test was performed inside a transparent polycarbonate chamber 22. Air of a desired RH was fed into the chamber 22 using a humidifier 24 (Homasy Model HM161B) that was coupled to a humidity sensor 26 (Inkbird Humidity Controller IHC200). This sensor 26 can measure RH from 5% up to 99% with 3% accuracy. Similarly, a passive dehumidifier—i.e., with no motor to force the air around it—(Eva Dry E-500) was used to decrease the humidity inside the chamber when necessary. The humidity sensor 26 was set to the desired level, the sensor then turned the humidifier 24 on and off when the desired humidity was achieved. Plasma-cleaned (hydrophilic) glass beads and beads treated with trichlogo(octadecyl)silane (TCOD), giving the particles a hydrophobic character, were used to vary the behavior of particles of different wettability in contact with a rough surface and RH present.

The approach to establish roughness on the substrate was to use a fine stainless-steel wire mesh. The mesh provided a reproducible substrate. The mesh surface investigated was a 325×2300 mesh (rectangular, Dutch weave). Each mesh roughness was measured, the mesh was surface plasma-cleaned and then mechanical impact tests under different relative air humidity levels were performed.

The preparation of the mesh to be used for the mechanical impact test involved two nylon washers to suspend the mesh away from aluminum stub. The first nylon washer was glued onto the aluminum stub, then tape was used on the edges of the washer; the mesh was then glued onto the washer edges. A second washer, also with glue on its edges, was glued on top of the mesh, leaving a clear area on the middle for viewing. An exemplary schematic of this set up is shown in FIG. 18.

Figure 18:
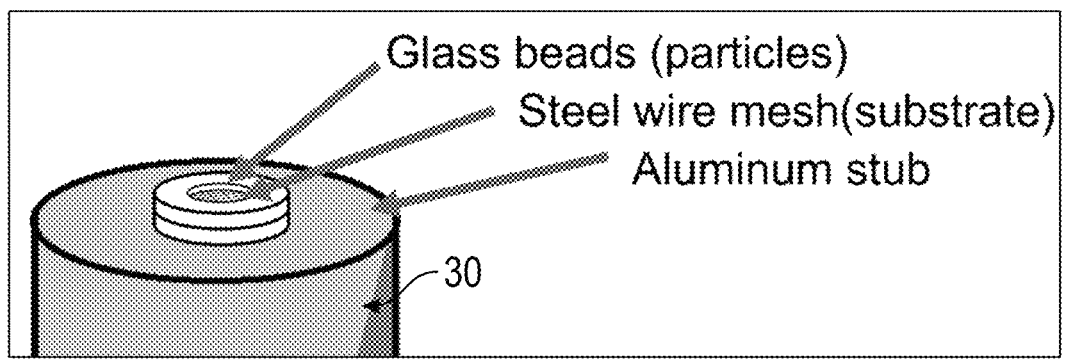
FIG. 18 is an image for an exemplary set up of particles and rough substrate on an aluminum stub for mechanical impact tests in accordance with an exemplary aspect of the present disclosure.

The set up shown in FIG. 18 was designed, for example, so that the central part of the mesh was not in contact with the glue. This setup also allowed the desired area to be visualized for bead presence/absence.

Figure 19:
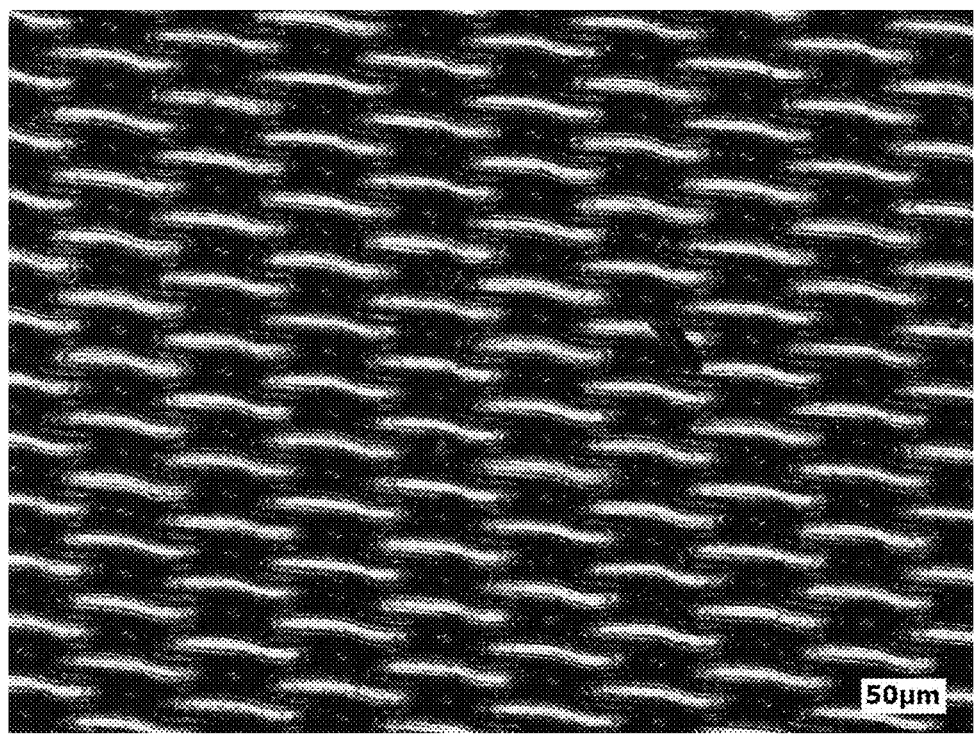
FIG. 19 is a laser image of a mesh in accordance with an exemplary aspect of the present disclosure.
Figure 20:
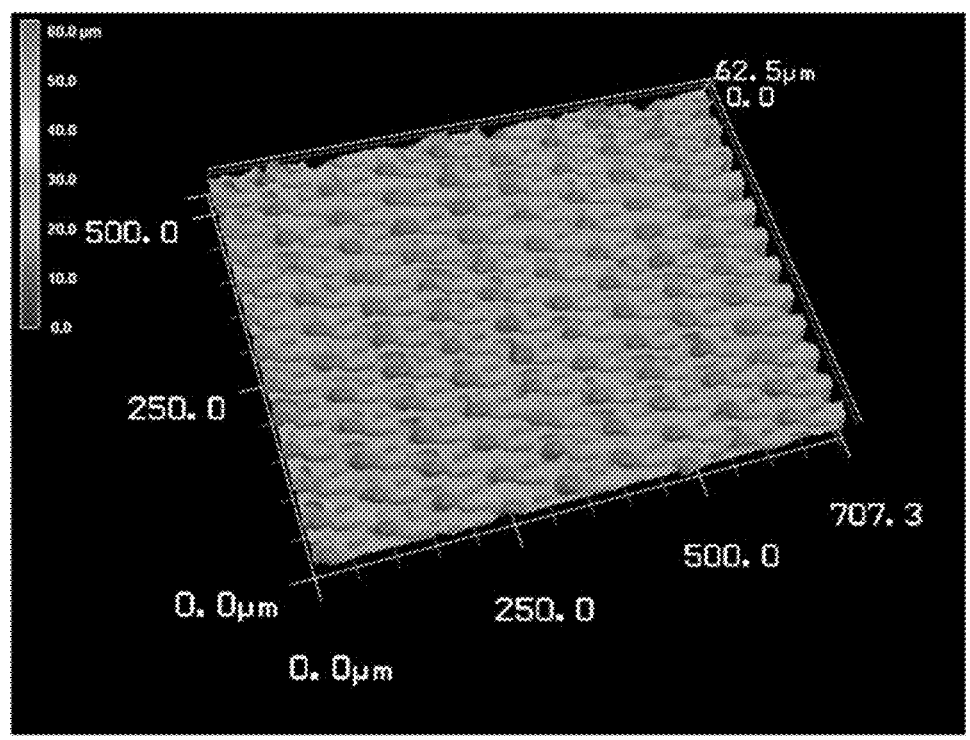
FIG. 20 is a 3D display of a mesh in accordance with an exemplary aspect of the present disclosure.

FIG. 19 shows a laser image of 325×2300 mesh, and FIG. 20 shows a 3D laser profilometer display of this mesh.

The opening dimensions and the surface roughness (Ra) of the 325×2300 mesh is shown in Table 5. Also, due to the size of the openings, the smallest diameter of beads used was 30 µm and the largest was 50 µm.

TABLE 5

Dimension and surface roughness of the 325 × 2300 mesh.

| Mesh | Opening dimensions (µm) | Roughness (Ra) (µm) | Rz (µm) |
|---|---|---|---|
| 325 × 2300 | 25 × 45 | 9.516 ± 1.094 | 47.430 ± 0.353 |

At 46% RH the recovery of particles is almost 100%, and this behavior remains at 85% RH. This higher recovery at 46% is explained by the higher number of points of contact between the particle and the rough substrate. Since the opening of this mesh is 25 µm×45 µm and the particle size varies from 30 to 50 µm, some particles interact with the mesh in a similar fashion to the third case showed in FIG. 17, allowing a greater area of contact than a single point.

Due to the constraint in the area available to pour the beads on the mesh (limited by the washer-mesh-washer arrangement) it was not possible to have both TCOD (hydrophobic) and plasma-cleaned (hydrophilic) beads on the same mesh to perform the test under the same parameters (mainly velocity and duration of impact). Nevertheless, tests were performed for both types of particles under similar parameters. The hydrophobic particles did not interact (adhere) as well as hydrophilic particles with greater RH. Even though there were more points of contact, the low wettability of the particle was an important factor to hinder the presence of capillary condensation in the same way as occurred using the sanded glass disk.

Figure 21:
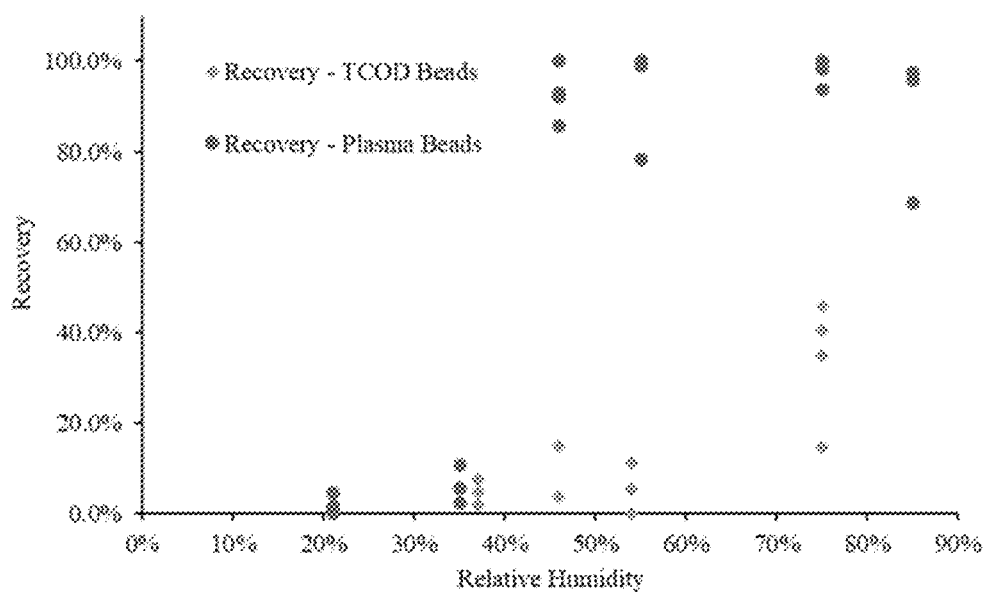
FIG. 21 is a plot illustrating correlation of interfacial energy versus relative air humidity for a plasma-cleaned mesh and different particles in accordance with an exemplary aspect of the present disclosure.

FIG. 21 shows the correlation of recovery of the different bead types on the mesh surface under different RH levels. The rough surface facilitated the recovery of plasma-cleaned beads, between 80% and 100% recovery. In addition, the variability of interfacial energy appears to be greatly reduced on these more similar surfaces. It can be concluded that a separation of different particle types can be achieved with controlled relative humidity and rough mesh surfaces.

Figure 22:
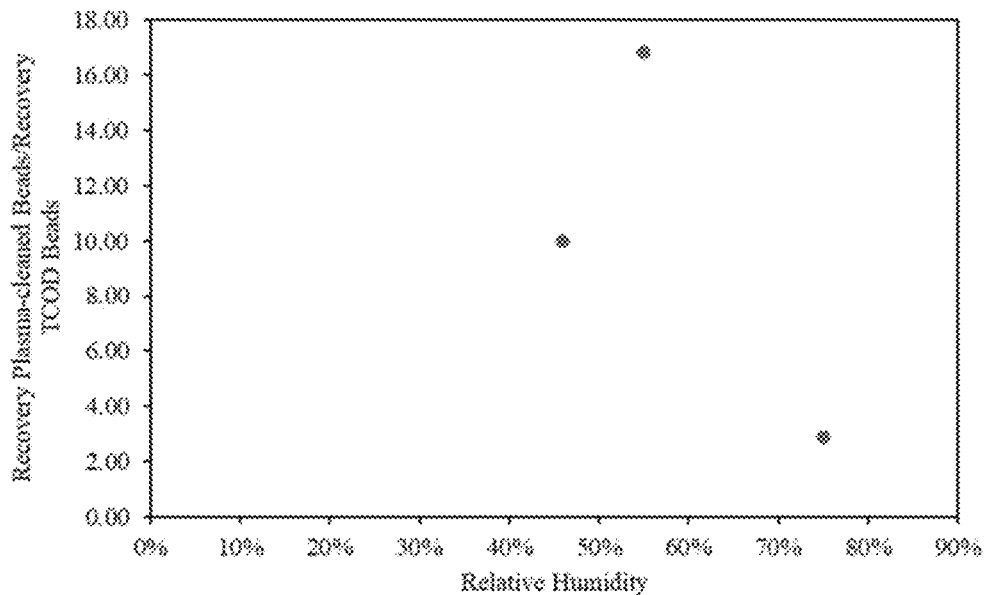
FIG. 22 is a plot illustrating differential recovery of plasma-cleaned beads/TCOD beads in accordance with an exemplary aspect of the present disclosure.

FIG. 22 shows the differential average recovery of plasma-cleaned beads over the TCOD beads at the same relative humidity level. The recovery of plasma-cleaned beads is significantly higher than the recovery of TCOD beads at 46% and 55% RH. At 75% the differential recovery decreases due to the fact that the capillary condensation on the hydrophilic surface can now affect the adhesion of hydrophobic particles. In other words, more TCOD particles remained attached on the mesh surface.

Figure 23:
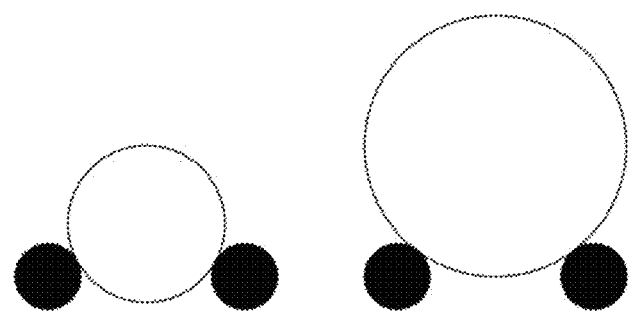
FIG. 23 is an image of 30 µm bead (left) and 50 µm bead (right) sitting on the stainless-steel mesh wires in accordance with an exemplary aspect of the present disclosure.

Using the stainless-steel mesh, the particle's dimensions were at the same order of magnitude as the asperities of the mesh. The opening of the mesh could hold the particle without trapping it. FIG. 23 shows a graphical representation of a 30 and 50 µm bead sitting on the mesh wires (25 µm aperture).

The smaller spherical particles have relatively more area of contact with the wires than the larger spheres. Because of capillary condensation happening at each point of contact, the adhesion of the beads on the mesh showed to be even stronger. For the plasma-cleaned beads the recovery values had an average of 92.5% recovery when the RH was between 46% and 85%. For the TCOD treated beads, the average recovery was 19.0% between 46% and 75%, indicating that the hydrophobic characteristic of the particle influenced its lower interaction with the mesh. This difference in recovery can be exploited to achieve separation of particles based upon adhesive forces.

The disclosure is not to be limited to the particular aspects described herein. In particular, the disclosure contemplates numerous variations in methods and systems for particle separator methods and systems. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes, or methods of the disclosure. It is understood that any other modifications, substitutions, and/or additions may be made, which are within the intended spirit and scope of the disclosure.

What is claimed is:

1. A system for separating particles of different surface energies through control of humidity, comprising:
    an enclosed separation chamber having a first end and an opposing second end with a controlled environment in an interior of the enclosed separation chamber for separating a plurality of particles, the enclosed separation chamber further comprising:
        a plurality of sensors for controlling the environment;
        a separation platform, wherein the separation platform has at least one surface comprising a mesh substrate, the mesh substrate having a surface roughness wherein at least one of the plurality of particles adhere to the mesh substrate, the separation platform configured to fit in an interior of an acceleration tube;
        the acceleration tube within the enclosed separation chamber configured to move the separation platform and the plurality of particles from the first end through the interior of the acceleration tube towards a flat backstop; and
        the flat backstop near the second end of the enclosed separation chamber;
    a controller operably connected to the enclosed separation chamber and the plurality of sensors;
    one or more compressed air regulators operatively connected to the enclosed separation chamber, a discharge of compressed air from the one or more compressed air regulators for controlling a velocity of the separation platform through the acceleration tube as the separation platform moves away from the first end towards the flat backstop near the second end;
    one or more properties of the plurality of particles within the separation chamber accessible to the separation chamber, wherein the one or more properties includes hydrophobicity; and one or more operating conditions for the controlled environment accessible to the controller, wherein the operating conditions comprise at least humidity of the controlled environment and an initial separation distance of the separation platform from the flat backstop;
wherein the separation platform identifies one or more particle types to separate from the plurality of particles at the substrate, controls the one or more operating conditions for the controlled environment based on one or more properties of the one or more particles for separating one or more particle types from the plurality of particles.

2. The system of claim 1, wherein the one or more properties of the plurality of particles comprises surface energy.

3. The system of claim 1, wherein the one or more operating conditions comprise air pressor, wherein the air pressure is controlled by the regulator, and wherein the regulator is a pressure regulator.

4. The system of claim 1, wherein the one or more operating conditions comprises changing an air pressure in the acceleration tube and wherein the air pressure corresponds to the one or more particle types for affecting a surface energy of the one or more particle types.

5. The system of claim 1, wherein the one or more regulators control the one or more operating conditions, where the one or more regulators comprises a pressure regulator.

6. The system of claim 1, wherein the one or more operating conditions comprises raising a humidity level in the separation chamber, wherein the humidity level corresponds to the one or more particle types for affecting a surface energy of the separation platform, and wherein one of the plurality of sensors is a humidity controller configured to raise or lower the humidity level.

7. The system of claim 6, further comprising:
a first surface treatment for separating a first specific set of particles from the plurality of particles, wherein the plurality of particles is sprinkled over hydrophilic glass.

8. The system of claim 7, further comprising:
a second surface treatment for separating a first specific particle type from the first specific set of particles, wherein the plurality of particles is sprinkled over hydrophobic glass.

9. The system of claim 1, further comprising:
a first separation setting accessible by the controller for identifying a first specific particle type to separate from the plurality of particles, identifying a surface energy for the first specific particle, actuating a particle treatment for the first specific particle, and controlling the humidity within the controlled environment based on one or more properties of the first specific particle, a surface treatment, and an operating condition.

10. The system of claim 1, wherein the acceleration tube is operated by the one or more regulators for accelerating the plurality of particles for separation by collision with the backstop.

11. The system of claim 1, wherein the one or more particle types of the plurality of particles comprise one or more fine mining minerals, wherein separating involves less water consumption than a flotation process for classifying and concentrating minerals.

12. A system for separating particles of different surface energies through control of humidity, comprising:
a separation chamber having at least an enclosed humidity controlled environment for separating one or more particle types from a plurality of particles, wherein the humidity is controlled by a humidity controller operatively connected to the separation chamber and a plurality of sensors enclosed within the separation chamber, the separation chamber having a separation platform comprising a plurality of particles and a mesh substrate, the separation chamber having a regulator to discharge compressed air for moving the separation platform through an acceleration tube within the separation chamber from a first end of the separation chamber towards a backstop disposed proximate to the second end of the separation chamber, wherein at least one of the one or more plurality of particles adhere to the mesh substrate;
wherein the one or more particle types are separated from the plurality of particles by controlling the humidity within the humidity controlled environment based on one or more properties of the one or more particle types, wherein the one or more particle types adheres to the substrate during separation.

13. The system of claim 12, further comprising:
one or more surface treatments of the plurality of particles to affect a surface energy of the one or more particle types, wherein the one or more surface treatments comprises the one or more particles being sprinkled over glass.

14. The system of claim 12, further comprising:
one or more treatments of the humidity controlled environment to affect a surface energy of the humidity controlled environment.

15. The system of claim 12, further comprising:
a specific particle type identified to separate from the plurality of particles, a surface energy identified for the specific particle, and a particle treatment for the specific particle, wherein the humidity within the humidity controlled environment is based on one or more properties of the specific particle and the particle treatment.

16. The system of claim 15, wherein the one or more properties of the specific particle comprises at least the surface energy and the hydrophobicity inherent of the material of which the particle is made.

17. The system of claim 12, further comprising:

a first specific particle type identified to separate from the plurality of particles and a second specific particle type to separate from the plurality of particles, a surface energy identified for the first and second specific particle types, and a particle treatment for the first and second specific particle types, wherein the humidity within the controlled environment is based on one or more properties of the first and second specific particle types and the particle treatment.

18. The system of claim 12, further comprising:

one or more surface treatments of the plurality of particles to separate a first specific particle type from the plurality of particles and a second specific particle type from the plurality of particles.

19. The system of claim 12, further comprising:

one or more treatments to the controlled environment for separating a first specific particle type from the plurality of particles and a second specific particle type from the plurality of particles.

20. The system of claim 12, further comprising:

one or more fine minerals separated from the plurality of particles during mining, wherein the mineral separation involves less water consumption than a flotation process for classifying and concentrating minerals.

21. A system for separating particles of different surface energies through control of relative humidity and substrate surface roughness, comprising:

an enclosed separation chamber having a first end opposing a second end and a top opposing a bottom, with a controlled environment having a separation platform with a mesh having substrate surface roughness and a controllable relative humidity for separating a plurality of particles, the relative humidity controlled by a controller and at least one sensor, the separation chamber having at least one pressure regulator disposed at the first end of the separation chamber, a backstop disposed at the second end of the separation chamber, and an acceleration tube disposed between the pressure regulator and the backstop, the at least one pressure regulator disposed at the first end of the separation chamber for propelling a plurality of particles away from the first end of the separation chamber, through the acceleration tube, and towards the backstop at the second end of the separation chamber;

one or more particle types to separate from the plurality of particles at the substrate surface roughness;

wherein the relative humidity and the substrate surface roughness within the controlled environment is controlled based on one or more properties of the one or more particle types for separating the one or more particle types from the plurality of particles.

22. The system of claim 21, wherein the one or more particle types comprise silicates, sulfides, sulfates, oxides, hydroxides, carbonates, phosphates, halides, and native elements.

23. A system for separating particles of different surface energies through control of relative humidity and substrate surface roughness, comprising:

a separation chamber with a controlled environment having a substrate surface roughness and a relative humidity control for controlling the relative humidity within the controlled environment;

a separation platform comprising at least a mesh substrate with a substrate surface roughness and a plurality of particles, the separation platform disposed initially at a first end of the separation chamber;

an acceleration tube within the separation chamber having a first end and an opposing second end, the acceleration tube configured to move the separation platform away from the first end of the separation chamber towards a backstop at the second end of the acceleration tube;

one or more particle types to separate from the plurality of particles within the controlled environment at the mesh substrate upon contact with the backstop;

a regulator for moving the separation platform from the first end of the separation chamber, through the acceleration tube, towards the backstop at the second end of the acceleration tube opposing the first end of the separation chamber;

a setting for the relative humidity controlled by the humidity controller and a selected one of the substrate surface roughness corresponding to one or more properties of the one or more particle types to be separated from the plurality of particles, the humidity detected using at least one sensor;

wherein the one or more particle types are separated from the plurality of particles by the setting for the relative humidity and the selected one of the substrate surface roughness within the controlled environment.

24. The system of claim 23, further comprising:

a particle surface treatment of the one or more particles to affect a surface energy of the one or more particle types for separating the one or more particle types from the plurality of particles.

* * * * *